US008228559B2

(12) United States Patent
Parmar et al.

(10) Patent No.: US 8,228,559 B2

(45) Date of Patent: Jul. 24, 2012

(54) SYSTEM AND METHOD FOR CHARACTERIZING COLOR SEPARATION MISREGISTRATION UTILIZING A BROADBAND MULTI-CHANNEL SCANNING MODULE

(75) Inventors: Manu Parmar, Mountain View, CA (US); Jon McElvain, Manhattan Beach, CA (US); Vishal Monga, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 616 days.

(21) Appl. No.: 11/804,806

(22) Filed: May 21, 2007

(65) Prior Publication Data

US 2008/0294363 A1 Nov. 27, 2008

(51) Int. Cl.
*G06K 15/00* (2006.01)
*H04N 1/46* (2006.01)

(52) U.S. Cl. ......... 358/2.1; 358/1.9; 358/3.26; 358/504; 358/515; 382/162; 382/167

(58) Field of Classification Search ........................ None
See application file for complete search history.

(56) References Cited

U.S. PATENT DOCUMENTS

| | | | | |
|---|---|---|---|---|
| 4,391,505 | A | 7/1983 | Silverberg | |
| 4,546,700 | A | 10/1985 | Kishner et al. | |
| 4,788,116 | A | 11/1988 | Hochberg | |
| 4,814,891 | A * | 3/1989 | Uchiyama et al. | 358/296 |
| 4,831,420 | A | 5/1989 | Walsh et al. | |
| 4,937,664 | A | 6/1990 | Chiku et al. | |
| 4,959,712 | A * | 9/1990 | Tsuzuki et al. | 358/517 |
| 5,081,507 | A | 1/1992 | Monkelbaan et al. | |
| 5,184,011 | A | 2/1993 | Hubble, III et al. | |
| 5,227,815 | A | 7/1993 | Dastin et al. | |
| 5,260,725 | A | 11/1993 | Hammond | |
| 5,272,493 | A | 12/1993 | Hubble, III et al. | |
| 5,278,625 | A | 1/1994 | Charnitski et al. | |
| 5,287,162 | A | 2/1994 | de Jong et al. | |
| 5,329,466 | A | 7/1994 | Monney | |
| 5,339,150 | A | 8/1994 | Hubble, III et al. | |
| 5,339,159 | A | 8/1994 | Nakamura et al. | |
| 5,342,715 | A | 8/1994 | Kamath et al. | |
| 5,384,592 | A | 1/1995 | Wong | |
| 5,406,066 | A | 4/1995 | Steinle et al. | |
| 5,418,556 | A | 5/1995 | Andrews | |
| 5,457,518 | A | 10/1995 | Ashikaga et al. | |

(Continued)

OTHER PUBLICATIONS

H.-L. Shen and J. J. Xin, Spectral characterization of a color scanner by adaptive estimation, Jul. 2004, J. Opt. Soc. Am. A, vol. 21, No. 7, pp. 1125-1130.*

(Continued)

*Primary Examiner* — Marivelisse Santiago Cordero
*Assistant Examiner* — Miya J Cato
(74) *Attorney, Agent, or Firm* — Gibb & Riley, LLC

(57) ABSTRACT

A system and method for characterizing color separation misregistration of a multi-color printing system utilizing a broadband multi-channel scanning module, such as an RGB scanner, are provided. The system and method include generating a spectral reflectance data structure corresponding to a broadband multi-channel scanning module. The spectral reflectance data structure includes at least one parameter. The at least one parameter may correspond to the broadband multi-channel scanning module and/or a printing module. The system and method further provide for calibrating a spectral-based analysis module by utilizing the spectral reflectance data structure. The system and method also include characterizing color separation misregistration utilizing the calibrated spectral-based analysis module by examining at least one plurality-separation patch.

23 Claims, 9 Drawing Sheets

U.S. PATENT DOCUMENTS 5,523,823 A 6/1996 Ashikaga
5,526,140 A 6/1996 Rozzi
5,537,190 A 7/1996 Folkins et al.
5,572,601 A 11/1996 Bloomberg
5,574,527 A 11/1996 Folkins
5,600,404 A 2/1997 Ando et al.
5,631,686 A 5/1997 Castelli et al.
5,636,330 A * 6/1997 Barak ........................... 358/1.9
5,689,425 A 11/1997 Sainio et al.
5,760,815 A 6/1998 Genovese
5,768,671 A 6/1998 Komiya et al.
5,774,156 A 6/1998 Guerin
5,778,280 A 7/1998 Komiya et al.
5,793,901 A 8/1998 Matsutake et al.
5,808,658 A 9/1998 Hoover
5,825,984 A 10/1998 Mori et al.
5,887,996 A 3/1999 Castelli et al.
5,909,235 A * 6/1999 Folkins ......................... 347/240
5,973,718 A 10/1999 Charnitski et al.
5,978,615 A * 11/1999 Tanaka et al. .................. 399/49
5,995,802 A 11/1999 Mori et al.
6,008,826 A 12/1999 Foote et al.
6,014,154 A 1/2000 Guerin
6,035,076 A 3/2000 Nagase
6,129,015 A 10/2000 Dewey
6,133,932 A 10/2000 Webb et al.
6,148,168 A 11/2000 Hirai et al.
6,154,628 A 11/2000 Kawano
6,164,847 A 12/2000 Allen
6,185,402 B1 2/2001 Linssen
6,198,490 B1 3/2001 Eom et al.
6,198,549 B1 3/2001 Decker et al.
6,198,550 B1 3/2001 Toyoda
6,215,512 B1 4/2001 Imaizumi et al.
6,236,470 B1 5/2001 Seachman
6,239,828 B1 5/2001 Ito et al.
6,246,857 B1 6/2001 Tanaka
6,253,678 B1 7/2001 Wentworth
6,275,244 B1 8/2001 Omelchenko et al.
6,288,556 B1 9/2001 Sato et al.
6,292,208 B1 9/2001 Lofhus et al.
6,295,435 B1 9/2001 Shinohara et al.
6,300,968 B1 10/2001 Kerxhalli et al.
6,310,681 B1 10/2001 Taniwaki
6,321,060 B1 11/2001 Nakayasu et al.
6,336,024 B1 1/2002 Kanaya et al.
6,369,842 B1 4/2002 Abramsohn
6,381,428 B1 4/2002 Yamamoto et al.
6,404,517 B1 * 6/2002 Chao ............................ 358/504
6,408,156 B1 6/2002 Miyazaki et al.
6,434,279 B1 8/2002 Shiba
6,441,915 B1 8/2002 Imaizumi et al.
6,441,923 B1 * 8/2002 Balasubramanian et al. ............................ 358/3.23
6,449,060 B1 9/2002 Kawai et al.
6,456,310 B1 9/2002 Wallace et al.
6,456,311 B1 9/2002 Harush et al.
6,459,823 B2 10/2002 Altunbasak et al.
6,462,821 B1 10/2002 Borton et al.
6,493,010 B1 12/2002 Takahashi et al.
6,493,011 B1 12/2002 Shioya
6,493,064 B2 12/2002 Cabiri et al.
6,493,083 B2 12/2002 Parisi et al.
6,526,240 B1 2/2003 Thomas et al.
6,529,616 B1 3/2003 Rasmussen et al.
6,556,313 B1 4/2003 Chang et al.
6,643,035 B1 11/2003 Salgado
6,644,773 B2 11/2003 Bildstein et al.
6,731,889 B2 5/2004 Nakayama
6,804,485 B2 10/2004 Martin et al.
6,842,590 B2 1/2005 Dalal et al.
6,856,336 B2 2/2005 Toyoda
6,889,028 B1 5/2005 Hunold et al.
6,909,516 B1 6/2005 Hoover
6,911,993 B2 6/2005 Nishikawa et al.
6,973,272 B2 12/2005 Yamamoto et al.
7,002,701 B1 2/2006 Nakayasu et al.
7,013,094 B2 3/2006 Dalal et al.
7,013,803 B2 3/2006 Hansen et al.
7,039,348 B2 5/2006 Kerxhalli et al.
7,071,957 B2 7/2006 Fujimoto
7,075,561 B2 7/2006 Ozawa et al.
7,085,009 B2 8/2006 Kawai et al.
7,100,508 B1 9/2006 Mader
7,106,477 B2 9/2006 Horobin
7,127,125 B2 10/2006 Perlmutter et al.
7,239,833 B2 7/2007 Tomita et al.
7,257,358 B2 8/2007 Overall et al.
7,376,375 B2 5/2008 Kobayashi et al.
7,438,379 B2 10/2008 Ishibashi et al.
7,443,535 B2 * 10/2008 Ishibashi ........................ 358/1.9
7,512,377 B2 3/2009 Choi
7,610,004 B2 * 10/2009 Kato et al. .................... 399/301
7,630,672 B2 12/2009 Baretsky et al.
7,652,790 B2 1/2010 Touura
7,658,462 B2 2/2010 Eom
7,706,031 B2 4/2010 Viturro et al.
7,826,095 B2 11/2010 Wang et al.
7,843,604 B2 11/2010 Higashiyama et al.
7,894,109 B2 2/2011 McElvain et al.
7,933,034 B2 4/2011 Takano
2001/0017645 A1 8/2001 Toda
2001/0021208 A1 9/2001 Ueyanagi et al.
2001/0033395 A1 10/2001 Chizawa
2001/0033686 A1 10/2001 Klassen
2002/0063907 A1 5/2002 Harrington
2002/0102114 A1 8/2002 Kawanishi
2002/0113968 A1 8/2002 Parisi et al.
2002/0118350 A1 8/2002 Cabiri et al.
2002/0122124 A1 9/2002 Suda
2002/0159802 A1 10/2002 Katahira
2002/0178952 A1 12/2002 Sainio et al.
2003/0002043 A1 1/2003 Abdulhalim et al.
2003/0044193 A1 3/2003 Thomas et al.
2003/0052959 A1 3/2003 Fujimoto
2003/0053093 A1 3/2003 Eom
2003/0063301 A1 4/2003 Klassen
2003/0086103 A1 * 5/2003 Mestha et al. ................. 358/1.9
2003/0090689 A1 5/2003 Klassen
2003/0098985 A1 5/2003 Horobin et al.
2003/0145745 A1 8/2003 Hansen et al.
2003/0145751 A1 8/2003 Hansen et al.
2003/0174184 A1 9/2003 Bildstein et al.
2003/0197877 A1 10/2003 Lee
2003/0210412 A1 11/2003 Ishibashi
2003/0214568 A1 11/2003 Nishikawa et al.
2004/0046981 A1 3/2004 Taka et al.
2004/0076450 A1 4/2004 Martin et al.
2004/0114025 A1 6/2004 Kerxhalli et al.
2004/0130737 A1 7/2004 Kamimura et al.
2004/0175196 A1 9/2004 Yamamoto et al.
2004/0191652 A1 9/2004 Dishon et al.
2004/0227966 A1 11/2004 Lee
2004/0239746 A1 12/2004 Ozawa et al.
2005/0047834 A1 3/2005 Tomita et al.
2005/0069220 A1 3/2005 Czyszczewski et al.
2005/0093956 A1 5/2005 Egan
2005/0111759 A1 5/2005 Perlmutter et al.
2005/0134874 A1 6/2005 Overall et al.
2005/0157297 A1 7/2005 Abdulhalim et al.
2005/0157317 A1 7/2005 Butterfield et al.
2005/0206934 A1 9/2005 Nishikawa et al.
2005/0206980 A1 9/2005 Nishikawa et al.
2005/0208685 A1 9/2005 Abdulhalim et al.
2005/0214037 A1 9/2005 Kishi
2005/0281459 A1 * 12/2005 Bala et al. ..................... 382/162
2006/0001765 A1 1/2006 Suda
2006/0005722 A1 1/2006 Nobukawa et al.
2006/0013603 A1 1/2006 Matsuyama
2006/0056882 A1 3/2006 Kwon et al.
2006/0065625 A1 3/2006 Abdulhalim et al.
2006/0114282 A1 6/2006 Mizes et al.
2006/0114283 A1 6/2006 Mizes et al.
2006/0115303 A1 6/2006 Kang et al.
2006/0119690 A1 6/2006 Park
2006/0120626 A1 6/2006 Perlmutter et al.

| | | | |
|---|---|---|---|
| 2006/0120772 | A1 | 6/2006 | Kitazawa et al. |
| 2006/0132807 | A1 | 6/2006 | Abdulhalim et al. |
| 2006/0139433 | A1 | 6/2006 | Yoshida |
| 2006/0159337 | A1 * | 7/2006 | Pearson et al. ................ 382/167 |
| 2006/0164506 | A1 | 7/2006 | Kitao |
| 2006/0171748 | A1 | 8/2006 | Inui et al. |
| 2006/0176354 | A1 | 8/2006 | Yoshida |
| 2006/0176355 | A1 | 8/2006 | An |
| 2006/0177246 | A1 | 8/2006 | Kawada et al. |
| 2006/0182472 | A1 | 8/2006 | Munakata et al. |
| 2006/0191437 | A1 | 8/2006 | Mader |
| 2006/0244980 | A1 | 11/2006 | Grace |
| 2006/0262326 | A1 | 11/2006 | Abdulhalim et al. |
| 2006/0263120 | A1 | 11/2006 | Hayakawa |
| 2006/0275057 | A1 | 12/2006 | Suzuki |
| 2006/0290767 | A1 | 12/2006 | Tezuka et al. |
| 2007/0002403 | A1 | 1/2007 | Klassen |
| 2007/0003332 | A1 | 1/2007 | Kim |
| 2007/0019056 | A1 | 1/2007 | Jung et al. |
| 2007/0048031 | A1 | 3/2007 | Kinoshita |
| 2007/0077059 | A1 | 4/2007 | Denoue et al. |
| 2007/0095235 | A1 | 5/2007 | Nielsen |
| 2007/0115339 | A1 | 5/2007 | Matsuzaki et al. |
| 2008/0030787 | A1 | 2/2008 | McElvain |
| 2008/0030788 | A1 | 2/2008 | McElvain |
| 2008/0030789 | A1 | 2/2008 | McElvain |
| 2008/0294363 | A1 | 11/2008 | Parmar et al. |

OTHER PUBLICATIONS

M. Shi and G. Healey, Using reflectance models for color scanner calibration, Apr. 2002, J. Opt. Soc. Am. A, vol. 19, No. 4, pp. 645-656.*

Hains, "The Influence of Halftone Orientation on Color Gamut", Recent Progress in Digital Halftoning, IS&T Pub. (1995).

Oztan et al., "Quantitive Evaluation of Misregistration Induced Color Shifts in Color Halftones", Electronic Imaging, vol. 5667, p. 225 (2000).

Yang et al., "Light Scattering and Ink Penetration Effects on Tome Reproduction", Pics 2000: Image Processing, Sys, Conf., Portland, OR, p. 225 (2000).

Arney et al., "Kubelka-Munk Theory and the MTF of Paper", Journ. of Imaging Science and Tech., vol. 47, No. 4, p. 339 (2003).

U.S. Appl. No. 11/496,907, Office Action Communication Dated Aug. 22, 2011, 23 pages.

JP Patent Application No. 2007-198484 Office Action (Notice of Grounds for Rejection) dated May 24, 2011, pp. 1-2.

Arney, et al., Kubelka-Munk Theory and the MTF of Paper, Journal of Imaging Science and Tech., vol. 47, No. 4, Jul./Aug. 2003, pp. 339-345.

Oztan, et al., "Quantitative Evaluation of Misregistration Induced Color Shifts in Color Halftones," Color ImaginX: Processing, Hardcopy, and Applications, Proc. of SPIE=IS&T Electronic Imaging, SPIE, vol. 5667, 2005, pp. 501-512.

Sharma, "Digital Color Halftones," Digital Color Imaging Handbook, Ch. 6, E. Dec. 2002.

Yang, et al., "Light Scattering and Ink Penetration Effects on Tone Reproduction," Inst. of Science and Tech., Linkping Univ., Sweden, PICS'2000, Mar. 2000.

U.S. Appl. No. 11/496,907, Filed Aug. 1, 2006, Office Action Communication Dated Mar. 1, 2010, 26 pages.

U.S. Appl. No. 11/496,907, Filed Aug. 1, 2006, Office Action Communication Dated Aug. 5, 2010, 16 pages.

U.S. Appl. No. 11/496,907, Filed Aug. 1, 2006, Advisory Action Communication Dated Oct. 6, 2010, 3 pages.

U.S. Appl. No. 11/496,907, Filed Aug. 1, 2006, Office Action Communication Dated Aug. 22, 2011, 23 pages.

U.S. Appl. No. 11/496,907, Filed Aug. 1, 2006, Office Action Communication Dated Dec. 16, 2011, 23 pages.

U.S. Appl. No. 11/496,907, Filed Aug. 1, 2006, Notice of Allowance Communication Dated Feb. 27, 2012, 10 pages.

U.S. Appl. No. 11/496,909, Filed Aug. 1, 2006, Office Action Communication Dated Mar. 18, 2010, 24 pages.

U.S. Appl. No. 11/496,909, Filed Aug. 1, 2006, Office Action Communication Dated Aug. 17, 2010, 15 pages.

U.S. Appl. No. 11/496,909, Filed Aug. 1, 2006, Advisory Action Communication Dated Oct. 20, 2010, 3 pages.

U.S. Appl. No. 11/496,909, Filed Aug. 1, 2006, Office Action Communication Dated Sep. 13, 2011, 13 pages.

U.S. Appl. No. 11/496,909, Filed Aug. 1, 2006, Notice of Allowance Communication Dated Dec. 15, 2011, 9 pages.

U.S. Appl. No. 11/496,909, Filed Aug. 1, 2006, Notice of Allowance Communication Dated Apr. 18, 2012, 8 pages.

U.S. Appl. No. 11/496,907, Filed Aug. 1, 2006, Notice of Allowance Communication Dated May 2, 2012, 19 pages.

* cited by examiner

SYSTEM AND METHOD FOR CHARACTERIZING COLOR SEPARATION MISREGISTRATION UTILIZING A BROADBAND MULTI-CHANNEL SCANNING MODULE

CROSS-REFERENCE TO RELATED U.S. PATENT APPLICATIONS

The present disclosure is related to previously filed U.S. patent applications entitled "SYSTEM AND METHOD FOR CHARACTERIZING COLOR SEPARATION MISREGISTRATION," filed on Aug. 1, 2006 and assigned U.S. patent application Ser. No. 11/496,909, "SYSTEM AND METHOD FOR CHARACTERIZING SPATIAL VARIANCE OF COLOR SEPARATION MISREGISTRATION," filed on Aug. 1, 2006 and assigned U.S. patent application Ser. No. 11/496,927, and "SYSTEM AND METHOD FOR HIGH RESOLUTION CHARACTERIZATION OF SPATIAL VARIANCE OF COLOR SEPARATION MISREGISTRATION," filed on Aug. 1, 2006 and assigned U.S. patent application Ser. No. 11/496,907, all three of which have been assigned to the present assignee, and the entire contents thereof, are hereby incorporated by reference.

BACKGROUND

1. Technical Field

The present disclosure relates to multi-color printing systems, and, in particular, to a system and method for characterizing color separation misregistration of a multi-color printing system utilizing a multi-channel scanner.

2. Description of Related Art

In multi-color printing systems a limited number of color separations are used for marking a substrate for achieving a wider variety of colors, with each separation marking the substrate using discrete shapes, such as dots having a circular or oval shape, or periodic line patterns. This concept is generally known as color halftoning, and involves combining two or more patterned separations on the substrate. The selection of color separations and halftone pattern designs are carefully chosen for achieving a visual effect of the desired color.

Many prior art printing systems use cyan, magenta, yellow and black (also referred to as CMYK) color separations that mark a substrate using discrete cluster dots. The dots may be marked in a dot-on-dot fashion, by marking the substrate with a first and second color separation, with the dots of the second color separation superimposed over the dots of the first color separation for achieving the desired color. In addition, the dots may be applied in a dot-off-dot fashion, with the dots of the second color separation placed in the voids of the dots of the first color separation for achieving the desired color. However, multi-color printing systems are susceptible to misregistration between color separations due to a variety of mechanical related issues. For both dot-on-dot and dot-off-dot rendering, color separation misregistration may cause a significant color shift in the actual printed color that is noticeable to the human eye.

Broadband multi-channel scanners are widely available. Typically, they include a plurality of channels each of which are responsive to a wide spectrum of optical wavelengths. Since the human eye has three types of daytime optical receptors (i.e., cone cells), broadband multi-channel scanners usually contain 3 channels, each of which are usually referred to as "Red", "Blue" and "Green" channels. Therefore, these broadband three-color scanners are called "RGB" scanners.

A widely used marking technology includes using rotated cluster dot sets since anomalies (e.g., color shifts) due to color separation misregistrations are subtle and less detectable by the human eye. However, even in these cases color misregistrations can be objectionable, particularly at edges of objects that contain more than one separation. Therefore, it is important to characterize color separation misregistration in order to perform corrective action in the print engine.

Many other methods for characterizing misregistration of color separations include using physical registration marks. The registration marks include two fine straight lines, each line formed using a different color separation. The two lines are aligned and joined to form one straight line. Alignment of the two lines is analyzed, with misalignment indicating misregistration of one of the color separations relative to the other. The analysis may include studying the printed registration marks with a microscope and visually determining if misregistration has occurred. Such analysis is tedious and not conducive to automation. The analysis may include imaging the marker with a high resolution scanning device and analyzing the high resolution scanned image using complex software for determining the positions of the registration marks relative to one another. These types of analysis sometimes require high-resolution scanning equipment and may involve a significant amount of computational power.

In another method used for higher end printer devices outputting high volume and/or high quality images, misregistration of color separations is characterized by measuring the transition time between the edges of two primary separation patches (e.g., cyan and magenta) on a moving photoreceptor belt. The patches have angled edges (e.g., chevrons) that allow the determination of misregistration in both the fast scan direction (transverse to the longitudinal axis of the photoreceptor belt) and slow scan direction (parallel to the longitudinal axis of the photoreceptor belt). Simple photo detectors are used to measure the time between the moving edges of the chevrons, and this can in turn be used to compute the misregistration in both slow and fast scan directions. However, there is a continuing need to characterize color separation misregistration effectively and/or efficiently.

SUMMARY

The present disclosure relates to multi-color printing systems, and, in particular, to a system and method for characterizing color separation misregistration of a multi-color printing system utilizing a multi-channel scanner.

One aspect of the present disclosure includes a method for characterizing color separation misregistration of a multi-color printing system that involves generating a spectral reflectance data structure. The spectral reflectance data structure may correspond to a broadband multi-channel scanning module and may include at least one parameter. The broadband multi-channel scanning module may be a RGB scanner. The method may provide for calibrating a spectral-based analysis module by utilizing the spectral reflectance data structure and characterizing color separation misregistration utilizing the calibrated spectral-based analysis module by examining at least one plurality-separation patch. The plurality-separation patch, described in more detail infra.

In another aspect thereof, the step of generating the spectral reflectance data structure may include marking a substrate to form a misregistration gamut target on the substrate. The misregistration gamut target may include at least one training patch and/or at least one Neugebauer primary patch. The step of marking the substrate to form a misregistration gamut target on the substrate may utilize a printing module. In addition, the step of generating the spectral reflectance data structure may also include scanning the misregistration gamut target utilizing a broadband multi-channel scanning module.

In another aspect thereof, at least one parameter mentioned supra, may be an approximation of at least one of $\hat{s}_i$, $\beta_{ii}$, and $\hat{\gamma}_k$, discussed in more detail infra. The approximation of $\hat{s}_i$ may be calculated by an $\hat{s}_i$ module. The $\hat{s}_i$ module may utilize Equation 6. The approximation of $\hat{\gamma}_k$ may be calculated by a $\hat{\gamma}_k$ module. The $\hat{\gamma}_k$ module may utilize Equation 13. The approximation of $\beta_{ii}$ may be calculated by a $\beta_{ii}$ module discussed in more detail infra.

In another aspect thereof, the step of calibration of the spectral-based analysis module by utilizing the spectral reflectance data structure may include inverting Equation 15 utilizing at least one parameter of the spectral reflectance data structure. Also, the step of inverting the Equation 15 may result in a solution in accordance with at least one of Equation 18 for at least one of P partitions of an RGB color space.

In another aspect thereof, the step of characterizing color separation misregistration utilizing the calibrated spectral-based analysis module by examining at least one plurality-separation patch may include scanning at least one plurality-separation patch utilizing the broadband multi-channel scanning module. Additionally or alternatively, the step may further include determining r', g', and b' for at least one plurality-separation patch and/or determining the approximate color separation misregistration within the spatial domain of at least one plurality-separation patch in accordance with at least one Equation 18 for the at least one of P partitions of the RGB color space by utilizing r', g', and b'.

In another aspect thereof, the present disclosure includes a system implemented by an operative set of processor executable instructions configured for execution by at least one processor for determining color separation misregistration in a multi-color printing system. The system may include a communication module, a spectral-based analysis module, a generation module, and/or a calibration module. The communication module may be configured for receiving a patch data structure. The patch data structure may correspond to at least one plurality-separation patch and may have been generated utilizing a broadband multi-channel scanning module, e.g., an RGB scanner. The spectral-based analysis module may be in operative communication with the communication module and may process the patch data structure to characterize color separation misregistration. Also, the spectral-based analysis module may be calibrated.

The generation module may generate a spectral reflectance data structure corresponding to a multi-channel scanner and the spectral reflectance data structure may include at least one parameter. The calibration module may calibrate the spectral-based analysis module by utilizing a spectral reflectance data structure. The calibration module may calibrate the spectral-based analysis module by utilizing the spectral reflectance data structure by inverting Equation 15 utilizing at least one parameter of the spectral reflectance data structure resulting in a solution in accordance with at least one Equation 18 for at least one of P partitions of an RGB color space. As mentioned above, at least one parameter may be an approximation of at least one of $\hat{s}_i$, $\beta_{ii}$, and $\hat{\gamma}_k$.

In another aspect thereof, a system implemented by an operative set of processor executable instructions configured for execution by at least one processor for estimating color separation misregistration is provided. The system may include a means for calibrating a spectral-based analysis module, and a means for characterizing a color separation misregistration by examining a plurality-separation patch utilizing an RGB scanner.

BRIEF DESCRIPTION OF THE DRAWINGS

These and other advantages will become more apparent from the following detailed description of the various embodiments of the present disclosure with reference to the drawings wherein.

DETAILED DESCRIPTION

Color shifts due to misregistration for dot-on-dot and dot-off-dot patterns have been described in the article by Warren L. Rhodes & Charles H. Hains, entitled "The Influence of Halftone Orientation on Color Gamut," published in "Recent Progress in Digital Halftoning", an Imaging Society & Technology publication, in January of 1995. Therein color shifts that may occur due to misregistration for dot-on-dot and dot-off-dot halftone-patterns are described in addition to the relationship between the value of chroma (C*) with regards to transition from dot-on-dot and dot-off-dot color separation registrations, which increases approximately monotonically as the halftone patterns transition therebetween.

Figure 1A:
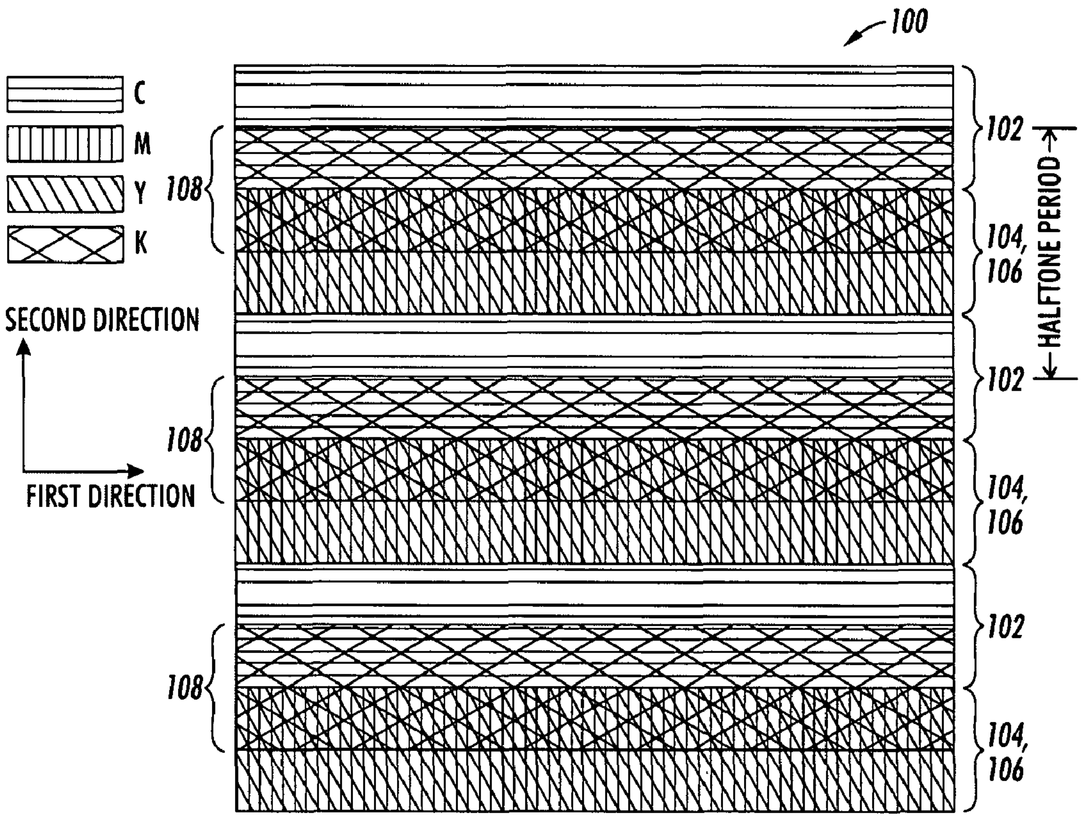
FIG. 1A is a graphic of a close-up view of a color separation misregistration patch referred to herein as a "plurality-separation patch", in accordance with the present disclosure.

Referring now to the drawings, FIG. 1A depicts a plurality-separation patch 100. Plurality-separation patch 100 is a species of color separation misregistration patches ("color separation misregistration patches" being the genus). The previously filed U.S. patent application entitled, "SYSTEM AND METHOD FOR HIGH RESOLUTION CHARACTERIZATION OF SPATIAL VARIANCE OF COLOR SEPARATION MISREGISTRATION", discloses a color separation misregistration patch that is configured for characterizing color separation misregistration of multiple separations relative to a reference separation (usually "K" is used as an example for reference) by utilizing overlapping color separation markings, referred to therein as a "measurement patch"; however, the aforementioned patch, described in more detail therein, is described herein as a "plurality-separation patch".

The plurality-separation patch 100 includes overlapping parallel lines using each of the color separations in a color space (CMYK in the present example) and having a first line pattern orientation, i.e., parallel lines along the first direction. A line pattern may be formed by a plurality of lines. For example, consider lines 102 that are marked by a "C" separation. Lines 102 form a line pattern of the "C" separation; lines 104 and 106 form a line pattern of the "Y and M" separations; lines 108 form a line pattern of the "K" separation. The CMYK color space in this example may be formed by Cyan, Magenta, Yellow, and Black inks (or toners). The CMYK color space is typically used by multi-color printing system. The CMYK color space may correspond to the individual inks (or toners) of a printing system utilized by a respective color separation, e.g., a printing system may have a "yellow" ink that marks paper with a specific color separation dedicated for marking paper with that ink. However, other combinations of toners and/or inks may be used.

Although the line patterns are depicted as being parallel to the axis of the first direction (refer to the axes depicted in FIG. 1A), other line pattern orientation may be used, e.g., lines 102, 104, 106, and 108 may be at a 45° angle to a line parallel to the axis of the first direction. As depicted, lines 102, 104, 106, and 108 are parallel to the axis of the first direction, and consequently, may determine each respective color separation misregistration relative to a K color separation in the second direction. Utilizing multiple color separations patches with multiple orientations may be needed to characterize color separation misregistration in both of the first and second directions. One method of rotation is described in a previously filed U.S. Application entitled "SYSTEM AND METHOD FOR CHARACTERIZING COLOR SEPARATION MISREGISTRATION".

Plurality-separation patch 100 may be a graphic depiction a digital image, e.g., FIG. 1A depicts plurality-separation patch 100 as a visualization of a digital image file that may be sent to color separations to mark on paper. Additionally or alternatively, plurality-separation patch 100 may be a depiction of a patch marked on a substrate with no color separation, e.g., a patched marked on paper with no relative C, M, and/or Y color separation misregistration relative to the K color separation.

Plurality-separation patch 100 may be utilized by a method for simultaneously estimating misregistration of C, M, and Y color separations relative to a K color separation from spectral measurements of plurality-separation patch 100. A unique reflectance spectrum may result from plurality-separation patch 100 based upon misregistration(s); and as long as the reflectance properties of the individual inks (or toners) of each respective color separation have suitable optical absorptions characteristics, an examination of the reflectance spectrum of plurality-separation patch 100 may be utilized to characterize color separation misregistration(s).

For an example, consider the following: assume that plurality-separation patch 100 is a depiction of an image stored in a file. If multiple color separations (CMYK is this example) are instructed to mark paper with plurality-separation patch 100, the "average" color appearance of the image as marked on the paper will be a function of the relative color separation misregistration of the C, M, and Y color separations relative to the K color separation. In addition, the reflectance spectrum of plurality-separation patch 100 may be measured by a spectrophotometer to assist in determining the color separation misregistration mentioned in this example.

Note that several of the color separation halftone-lines are shifted relative to the K halftone pattern lines (also referred to as halftone lines). For example, the C halftone lines are phase shifted −L/4 relative to K. And the M and Y halftone lines are phase shifted +L/4 relative to K. Note that the halftone lines are repeating creating a periodic halftone pattern; the repeating pattern is defined as having a period L. For misregistrations of the C, M, and Y color separations relative to the K color separations, a unique reflectance spectrum exists for each possible color misregistration.

Figure 1B:
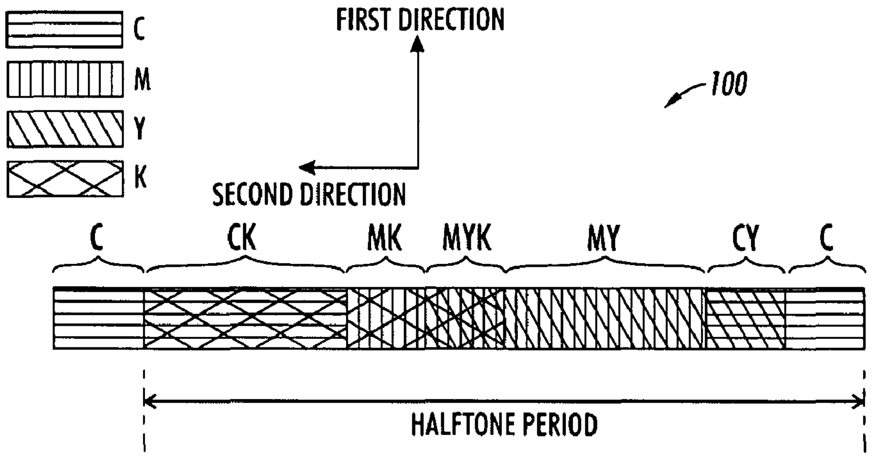
FIG. 1B is a graphic of a close-up cross-section side-view of a plurality-separation patch having color separation misregistration in accordance with the present disclosure.

Referring now to the drawings, FIG. 1B is a cross-section view of a plurality-separation patch 100 as marked on a substrate with a color separation misregistration of the Y color separation in the negative second direction relative to the C, M, and K color separations. Note that the orientation of the axes of FIG. 1B relative to that of FIG. 1A for proper orientation; however, the cross-section view of plurality patch 100 is not to scale and does not possess the same proportions as depicted in FIG. 1A. Additionally, FIG. 1B is shown consistent with a plurality-separation patch 100 with a color separation misregistration while FIG. 1A does not (assuming it is a depiction of a patch marked on a substrate rather than a depiction of an image file).

There may be significant disparity between the actual reflectance spectrum vs. the predicted reflectance spectrum of plurality-separation patch 100. Substrate scattering can cause significant deviations in actual reflectance spectrum compared to some predicted reflectance spectrum theoretical models of plurality-separation patch 100. This disparity is partly because photons entering into one region of plurality-separation patch 100 may emerge from another region of plurality-separation patch 100. The reflectance spectrum of plurality-separation patch 100 may be mathematically modeled using a probabilistic framework to account for substrate scattering, e.g., paper scattering. To account for scattering of local substrate, plurality-patch 100's reflectance spectrum may be described in terms of a point spread function PSF(x-x'), indicating the probability that a photon will enter the substrate at region at region x and exit at region x'. The average reflectance across a halftone cell (and by extension plurality-patch 100) can be computed by:

$$R(\lambda) = R_p(\lambda)\sum_{mn} \beta_{mn} T_m(\lambda) T_n(\lambda). \quad (1)$$

The coefficients $\beta_{mn}$ of Equation 1 are based purely upon the geometric properties of plurality-patch 100 and describe the coupling between region m and region n. And $T_m(\lambda)$ is the transmission of the $m^{th}$ region as shown in FIG. 1B.

Figure 2A:
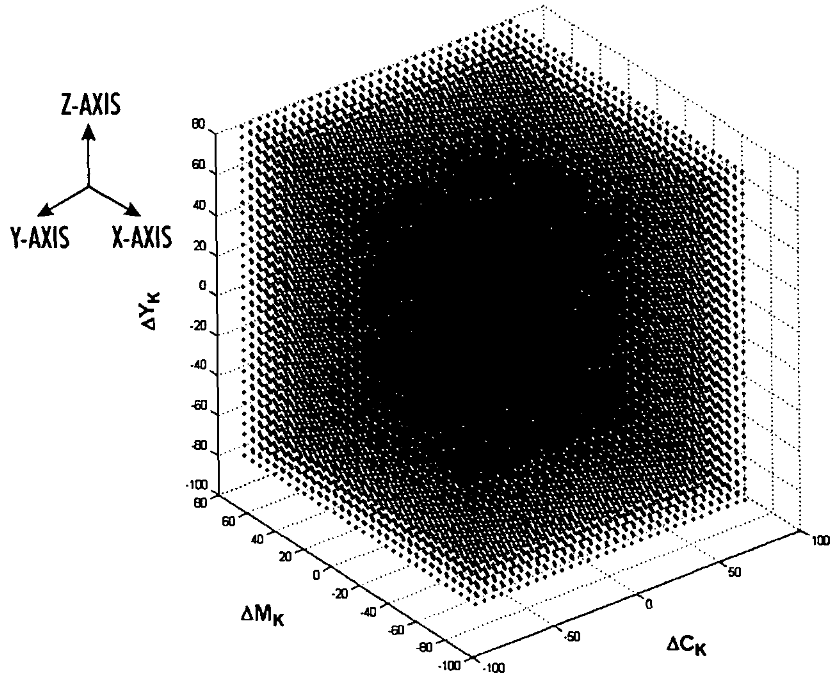
FIG. 2A is a 3-axes graphic depicting multiple color separation misregistration states relative to a reference color separation "K" in accordance with the present disclosure.
Figure 2B:
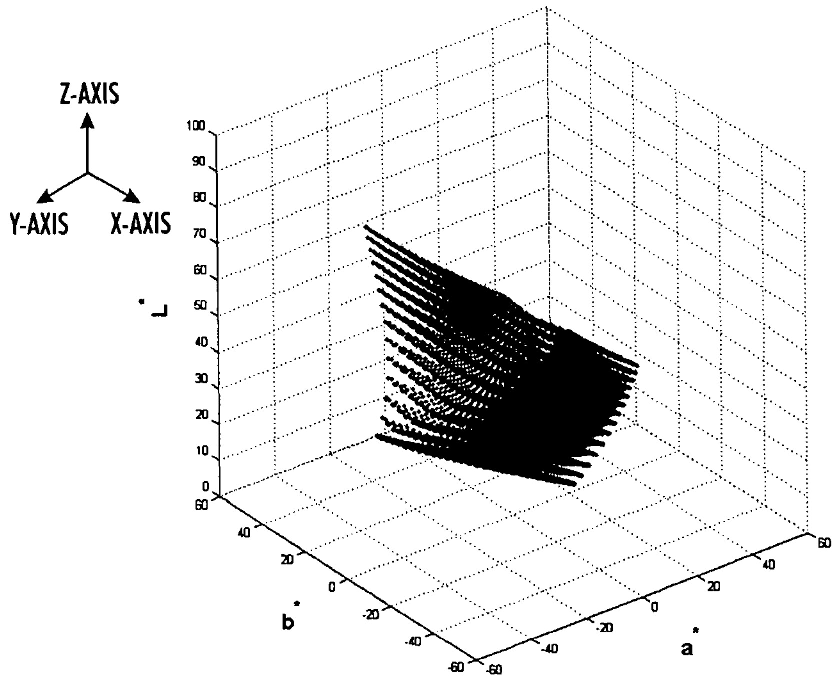
FIG. 2B is a 3-axes graphic of a CIE 1976 L*a*b* color space depicting multiple discrete reflectance spectra that correspond to the color separation misregistration states depicted in FIG. 2A in accordance with the present disclosure.

Referring simultaneously to FIGS. 2A and 2B, FIG. 2A is a 3-axes graphic depicting multiple color separation misregistration states relative to a reference color separation "K" and FIG. 2B is a 3-axes graphic of a CIE 1976 L*a*b* color space depicting multiple discrete reflectance spectra that correspond to the color separation misregistration states depicted in FIG. 2A. FIG. 2A shows discrete misregistration states with a resolution of about 5 μm relative to a "K" color separation and may correspond to misregistration states associated with plurality-patch 100. Also, FIG. 2A may correspond to the misregistration states of plurality-patch 100 in a specific direction, e.g., the second direction of plurality-patch 100 as depicted in FIG. 1A.

Utilizing Equation 1, an estimate of the reflectance spectra resulting from each possible misregistration state depicted in FIG. 2A of plurality-patch 100 may be calculated. The resulting reflectance spectra may be depicted as a corresponding discrete reflectance spectra in terms of a CIE 1976 L*a*b color space as depicted in FIG. 2B. For example, a misregistration of a plurality-patch 100 as marked on the substrate may have a misregistration of: 15 μm of a "Y" color separation in a second direction, 10 μm of a "C" color separation in second direction and a −20 μm misregistration of a "M" color separation in the second direction. These misregistration states are described in terms of a differential to the "K" color separation. Thus, there is a color separation misregistration state corresponding to the misregistration state described, and utilizing Equation 1, a discrete reflectance spectra in term of a CIE 1976 L*a*b color space may be calculated. That calculation may be depicted as a discrete reflectance spectra in FIG. 2B.

Each misregistration state depicted in FIG. 2A may be considered to be mapped (i.e., correspond) to a depicted discrete reflectance spectra within the graphic of FIG. 2B utilizing Equation 1. A lookup table may be generated that maps the misregistration states of FIG. 2A to the corresponding spectra of FIG. 2B. The lookup table may be implemented in hardware, software, software in execution, or some combination thereof. Additionally or alternatively, the lookup table may be a data structure such as an array and/or an associative array. If an estimated reflectance spectra is measured by a spectrophotometer of plurality-patch 100, and within the lookup table there is not a discrete value described therein, a discrete reflectance spectra that is closest to the measured reflectance in terms of Euclidian distance to may be chosen to determine a discrete color separation misregistration state of FIG. 1A. Additionally or alternatively, an interpolation algorithm may be utilized in order to determine a color separation misregistration estimate utilizing a Lookup table.

However, note that a measurement patch, such as plurality-patch 100 has the property of having a spatial domain for determining and/or estimate color separation misregistration. For example, plurality-patch 100 may have a spatial domain corresponding approximately to the length and width dimensions of the patch and may only estimate color separation misregistration in the second direction. Another separation patch may be needed to estimate color separation in a certain spatial domain to character color separation misregistration in the first and second directions. The spatial domain may be the area of a substrate in which a color separation misregistration patch (such as plurality-patch 100) may be used to measure and/or estimate the color separation misregistration of that region of the substrate.

Figure 3A:
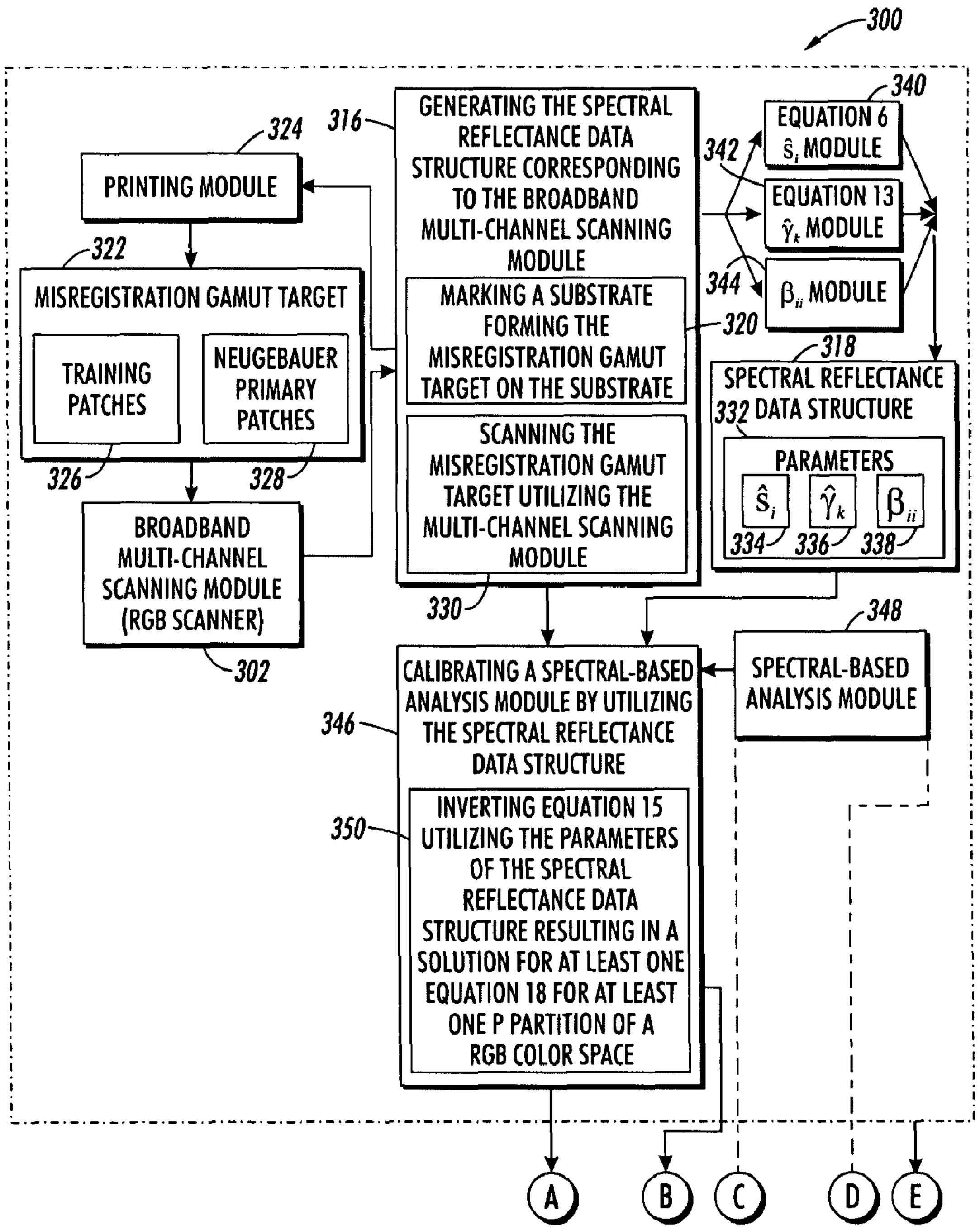
FIGS. 3A-3B are a flow chart diagram depicting a method for characterizing color separation misregistration of a multi-color printing system utilizing a broadband multi-channel scanning module in accordance with the present disclosure.
Figure 3B:
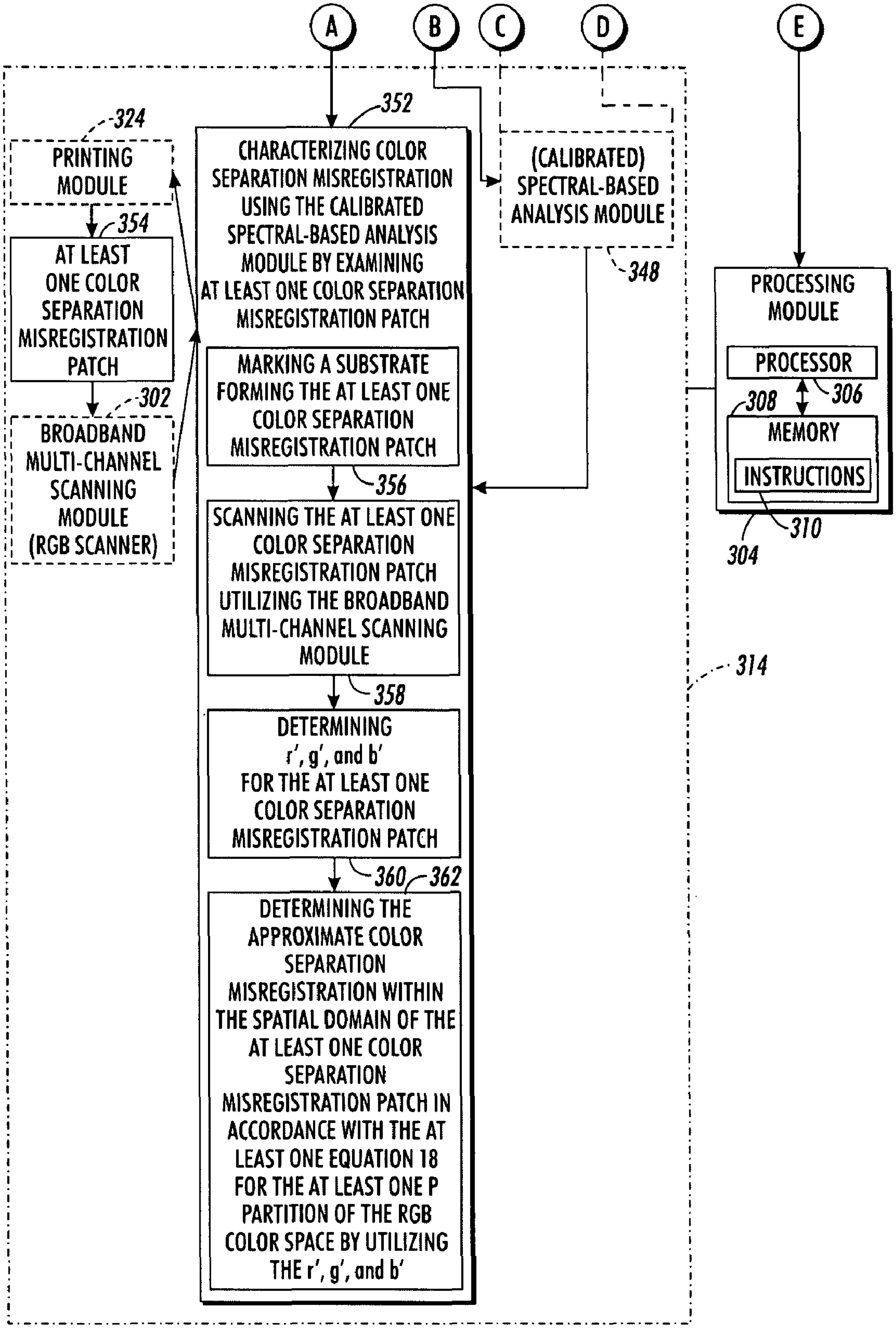

Referring simultaneously to FIGS. 1A, 1B, and 3, and note as mentioned supra, the previously filed U.S. patent entitled, "SYSTEM AND METHOD FOR HIGH RESOLUTION CHARACTERIZATION OF SPATIAL VARIANCE OF COLOR SEPARATION MISREGISTRATION", describes in more detail the spectral effects of a color separation misregistration has on plurality-separation patch 100 as may be measured from a spectrophotometer; however, FIG. 3, depicts a flow chart diagram of a method 300 for characterizing color separation misregistration of a multi-color printing system utilizing a broadband multi-channel scanning module 302. Broadband multi-channel scanning module 302 may be a Red, Green, Blue (RGB) scanner. For example, broadband multi-channel scanning module 302 may be the Canon DR 1210C or the Xerox DocuMate 152. (Note that broadband multi-channel scanning module 302 is depicted twice in FIG. 3 only for providing a more intuitive representation of method 300 and should be considered to be the same module).

Referring now to the drawings, FIG. 3, depicts a method 300 that may be implemented by processing module 304 that may include processor 306. Processor 306 may be a microprocessor, a microcontroller, a virtual processor on a virtual machine, an ASICS microchip, soft microprocessor, software emulation of hardware, or other device sufficient for processing instructions. Additionally or alternatively, processor 306 may communication with memory 308. Memory 308 may include data and/or instructions 310, e.g., processing module 304 may follow the Von Neumann architecture. Alternatively, in another embodiment, processing module 304 may follow the Harvard architecture, i.e., instructions 310 may be outside of memory 308 and may be part of other memory (not depicted).

Method 300 contains off-line stage 312 and on-line stage 314. In this exemplary embodiment, method 300 may use the acts within off-line stage 312 once and, alternately, may use on-line stage 314 multiple times, e.g., off-line stage 312 is mostly used for execution of a one-time calibration algorithm while on-line stage 314 characterizes color separation misregistration multiple times.

Method 300 may include step 316, which is generating the spectral reflectance data structure 318 corresponding to broadband multi-channel scanning module 302. Step 316 may include step 320 that is marking a substrate, e.g., paper, to form a misregistration gamut target, such as misregistration gamut target 322. Step 320 may utilize printing module 324 to accomplish the marking. Printing module 324 may be a printer, a printer system, a software interface, e.g., a software driver, and/or other technology that has the capability to directly and/or indirectly to form misregistration gamut target 322.

Misregistration gamut target 322 may include training patches 326 and Neugebauer primary patches 328. The relevance of gamut target 322 including training patches 326 and Neugebauer primary patches 328 is discussed in more detail infra. Broadband multi-channel scanning module 302 may scan the misregistration gamut target 322 during step 330 to assist in generating spectral reflectance data structure 318. Broadband multi-channel scanning module may be a RGB scanner, a software interface to a scanner, a two or more channel scanner, and/or any other hardware and/or software device that is sufficient to assist in generating spectral reflectance data structure 318.

Spectral reflectance data structure 318 may include parameters 332. Parameters 332 may be a data file, implemented in software, hardware, and/or some combination thereof. Additionally or alternatively, parameter 332 may be any technology to store data. Parameters 332 may include parameters 334, 336, and/or 338. Parameter 332 may be an approximate of $\hat{s}_i$ and/or may be a representation of $\hat{s}_i$; parameter 336 may be an approximate of $\hat{\gamma}_k$ and/or may be a representation of $\hat{\gamma}_k$; and finally parameter 332 may be an approximation of $\beta_{ii}$ and/or may be a representation of $\beta_{ii}$. Parameters 334, 336 and 339 are described in more detail infra.

Parameter 334 may be calculated by $\hat{s}_i$ module 340 utilizing Equation 6 parameter 336 may be calculated by $\hat{\gamma}_k$ module 342 utilizing Equation 13; and parameter 338 may be calculated by $\beta_{ii}$ module 344. The way in which the $\beta_{ii}$ module 344 calculates parameter 338 may be found by referencing the previously filed U.S. application, entitled, "SYSTEM AND METHOD FOR HIGH RESOLUTION CHARACTERIZATION OF SPATIAL VARIANCE OF COLOR SEPARATION MISREGISTRATION", and more specially by referencing Equation 7 found therein.

Method 300 may include step 346, which is calibrating analysis 348 module by utilizing the spectral reflectance data structure 328. Step 346 may include step 350, which is inverting Equation 15 utilizing parameters 332 of spectral reflectance data structure 318 resulting in a solution for at least one Equation 18 for at least one P partition of a RGB color space. Step 346 is discussed in more detail infra.

Spectral-based analysis module 348 may be implemented in hardware, software, or some combination thereof and may be utilized to assist broadband multi-channel scanning module 302 in determining color separation misregistration associated with printing module 324. Spectral-based analysis module 328 may be calibrated one or more times and/or in another embodiment may be partially or wholly calibrated before off-line stage 312.

Step 346 calibrates spectral-based analysis module 348 that becomes calibrated spectral-based analysis module 348, ready for characterizing color separation misregistration. Note that calibrated spectral-based analysis module 348 is part of on-line stage 314.

Step 352 is characterizing color separation misregistration utilizing the calibrated spectral-based analysis module by examining at least one color separation misregistration patch (depicted as at least one color separation misregistration patch 354). The calibrated spectral-based analysis module referred to in step 352 may be (calibrated) spectral-based analysis module 348. Calibrated spectral-based analysis module 348 may implement and/or control step 352, e.g., For example, calibrated spectral-based analysis module may control step 352 by utilizing an application programming interface ("API"), an application binary interface ("ABI"), a remote procedure call (RPC), Inter-Process Communication (IPC), any message passing scheme and/or any other sufficient implementation, e.g., communicating with drivers. Additionally or alternatively, the patch mentioned may be the one referred to in steps 356 through 362. Step 356 is marking a substrate forming the at least color separation misregistration patch 354. Step 356 may be accomplished by printing module 324 printing at least one color separation misregistration patch 354.

Step 352 may also include step 358 which is scanning the at least one color separation 354 utilizing the broadband multi-channel scanning module 302. As mentioned supra, broadband multi-channel scanning module may be a RGB scanner. Step 360 is determining r', g', and b' for the at least one color separation misregistration patch 354, discussed in more detail infra. Step 360 may utilize the scanning that takes place in step 358. And step 362 is determining the approximate color separation misregistration within the spatial domain of the at least one color separation misregistration patch 354 in accordance with the at least one Equation 18 for the at least one P partition of the RGB color space by utilizing the r', g', and b'. This is discussed in more detail infra as well.

A further discussion of the mathematical basis for method 300 follows. An operator that projects a reflectance spectra to the scanner space of the broadband multi-channel scanning module 302 is needed. Typically, multi-channel color scanners measure the intensities of each respective channel (three in an RGB scanner). The intensity of the three channels of a RGB scanner (such as broadband multi-channel scanning module 302) as measured at a particular pixel, $y_i$, (i=r,g,b) for a three channel color scanner, is given by:

$$y_i = \int_{\lambda_1}^{\lambda_2} (f_i(\lambda)d(\lambda)l(\lambda))R(\lambda)d\lambda + \eta_i, \tag{2}$$

where i=r,g,b for a three channel scanner, e.g., RGB scanner, $f_i(\lambda)$ is the sensitivity of the $i^{th}$ color channel of broadband multi-channel scanning module 302 as a function of the wavelength, $d(\lambda)$ is the sensitivity of the detector of broadband multi-channel scanning module 302, $l(\lambda)$ describes the spectral distribution of the scanner illuminant of broadband multi-channel scanning module 302, $R(\lambda)$ is the reflectance of the measured pixel as detected by broadband multi-channel scanning module 302 of a portion of at least one color separation misregistration patch 354, and $\eta_i$ is the measurement noise. Broadband multi-channel scanning module 302 is defined as being sensitive in the optical wavelength range of$(\lambda_1,\lambda_2)$, which may related to the actual optical wavelength sensitivity of broadband multi-channel scanning module 302. Let $$s_i(\lambda)=f_i(\lambda)d(\lambda)l(\lambda), \tag{3}$$

be the combined quantum efficiency of the color filter, detector and scanner illuminant associated with broadband multi-channel scanning module 302. The intensity measured at each color channel is then given by the inner product $(s_i(\lambda),r(\lambda))$ and the signal acquired by broadband multi-channel scanning module 302 for a particular pixel with reflectance $R(\lambda)$ is the projection of $R(\lambda)$ to the space spanned by $s_i(\lambda)$, i=r,g,b.

Generally, a reflectance spectrum is considered to be adequately sampled in discrete form when the reflectance spectrum is sampled 31 times in the range of approximately 400 nm to 700 nm. The signal acquired for each pixel may be described by the matrix-vector equation $$y=S^T r \tag{4}$$

where $\{.\}^T$ represents the matrix transpose, $y \in \mathfrak{R}^{3\times 1}$ is the measured RGB color, $S \in \mathfrak{R}^{31\times 3}$ is a matrix that has the combined quantum efficiencies of the three channels as its columns of broadband multi-channel scanning module 302, and $r \in \mathfrak{R}^{31\times 1}$ is the sampled reflectance spectrum of a measured pixel, e.g., a sample taken from plurality-patch 100. For a large number of scanner measurements, Equation 9, discussed infra, allows for the formulation of three over-determined systems of equations of the form of Equation 5 as follows:

$$y_i=Rs_i,\ i=r,g,b \tag{5}$$

Equation 5 may be used to independently relate three color measurements from N patches at each channel of broadband multi-channel scanning module 302 to a corresponding reflectance spectra of each respective patch. For example, consider an exemplary patch referred to as $N_5$ patch. $N_5$ patch may be measured utilizing broadband multi-channel scanning module 302. With the reflectance measurement in R of Equation 5 and with the information of $s_i$ corresponding to broadband multi-channel scanning module 302, the corresponding channels may be mapped to $y_i$, which is illustrated in Equation 5.

The rows of the matrix R may be formed by stacking $r_k^T$, k=1,2 . . . , N, the reflectance spectra corresponding to the measurements in $y_k$.

Estimates of $s_i$ can be obtained by solving Equation 5. To ensure that the estimates of $s_i$ are sufficiently accurate for RGB values likely to result due to a color separation misregistration, we need to choose a training set of N patches that well represent the range of RGB values of color separation misregistration states.

Figure 4A:
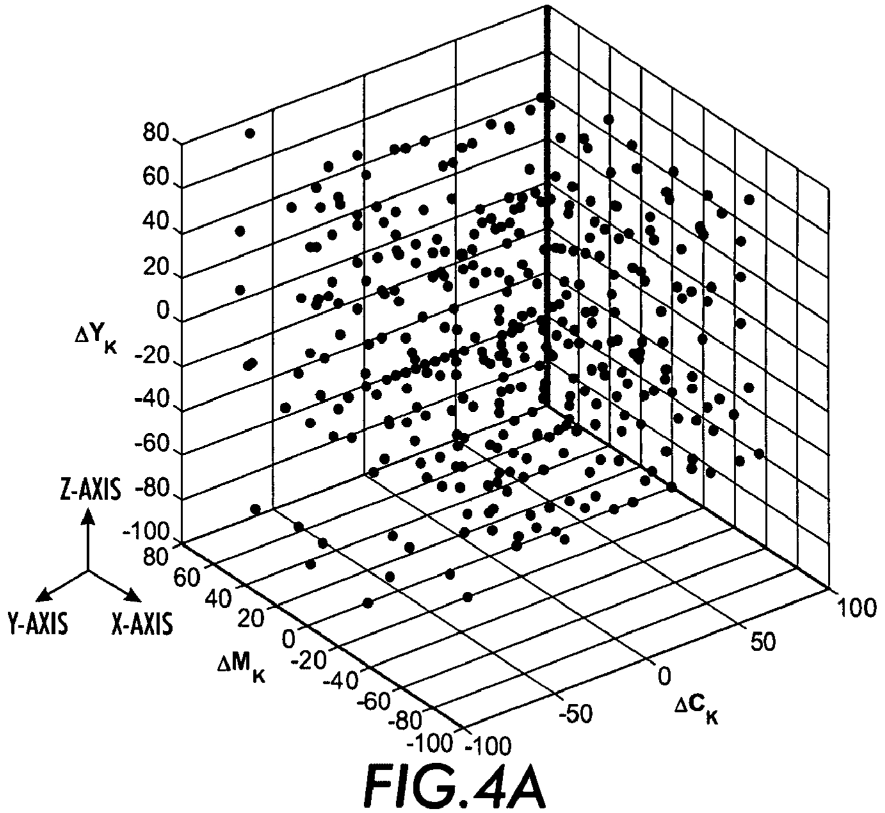
FIG. 4A is a 3-axes graphic depicting multiple color separation misregistration states relative to a reference color separation "K" that corresponds to the multiple discrete reflectance spectra of FIG. 4B where the data results from a k-means algorithm in accordance with the present disclosure.
Figure 4B:
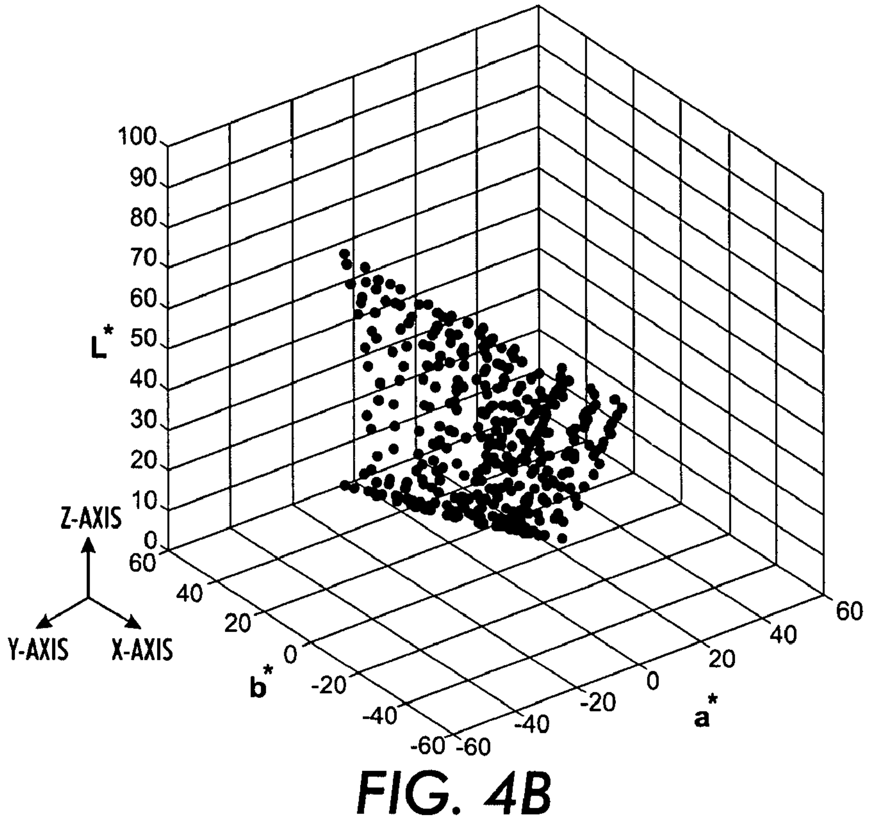
FIG. 4B is a 3-axes graphic of a CIE 1976 L*a*b* color space depicting multiple discrete reflectance spectra where the data results from a k-means algorithm in accordance with the present disclosure.

Referring now simultaneously to FIGS. 2A, 2B, 3, 4A, and 4B, a k-means algorithm was used to cluster the reflectance spectra depicted in FIG. 4A to obtain a reduced number of reflectance spectra that represent a reduced but sufficient number of color separation misregistration states depicted in FIG. 4A with the corresponding reflectance spectra whose CIELAB representations are shown in FIG. 4B. Each color separation misregistration state depicted in FIG. 4A may be mapped to a reflectance spectra depicted in FIG. 4B. Additionally or alternatively, a lookup table may be generated that maps the misregistration states of FIG. 4A to the corresponding spectra depicted in FIG. 4B. FIG. 4B has the 3-dimensional domain of a CIE 1976 L*a*b* color space. The resulting CIE 1976 L*a*b* color space values and the corresponding color separation misregistration states are shown in FIGS. 4B and 4A, respectively, and may correspond to training patches 326 of FIG. 3. Misregistration gamut target 322 may be formed from 353 patches having approximately the same reflectance spectra as the discrete spectra represented in FIG. 4B. Additionally, Misregistration gamut target 322 may have patches corresponding to the Neugebauer primaries of printing module 324, e.g., Neugebauer primary patch 328.

However, the systems of equations that may be expressed by Equation 5 are ill-posed, i.e., no exact solution is likely to be determined, and can not be reliably solved as a least-squares problem. However, the standard regularization solution may be used and the smoothness of the quantum efficiency functions may be utilized. The sharp peaks may be neglected that may be present in the efficiency functions due to the spectral power distribution of the illuminant associated with broadband multi-channel scanning module 302. However, rather than using Equation 5 to solve for $\hat{S}_i$, an Equation 6 with the function being smoothed utilizing $\alpha_i$ and L is shown infra. The concept of "smoothing" may be found in the book titled, "Nonlinear Programming," 2$^{nd}$ edition, by Dimitri P. Bertsekas, ISBN: 1-886529-00-0, published by Atena Scientific.

Therefore, three efficiency functions may be obtained by utilizing:

$$\hat{s}_i = \arg\min_{s_i} \|y_i - Rs_i\|_2^2 + \alpha_i \|Ls_i\|_2^2 \tag{6}$$

where $y_i \in \Re^{N\times 1}$ (N is the number of patches measured that may be included in misregistration gamut target 322 as training patches 326), $L \in \Re^{31\times 31}$ is the Laplacian operator that provides a penalty on the roughness of $s_i$, $\alpha_i$ are regularization parameters and are chosen using generalized cross validation (GCV). Referring to FIG. 3, module 340 may utilize Equation 6 for determining parameter 334.

Figure 5A:
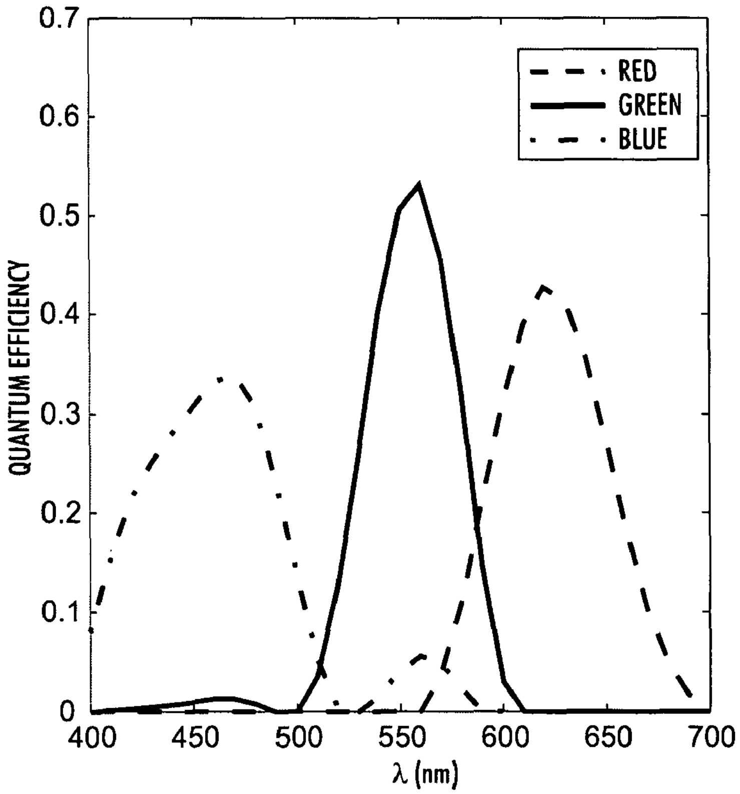
FIG. 5A is a 2-axes graphic depicting the combined quantum efficiency functions obtained by solving Equation 10 of three channels (RGB) of a multi-channel scanner in accordance with the present disclosure.
Figure 5B:
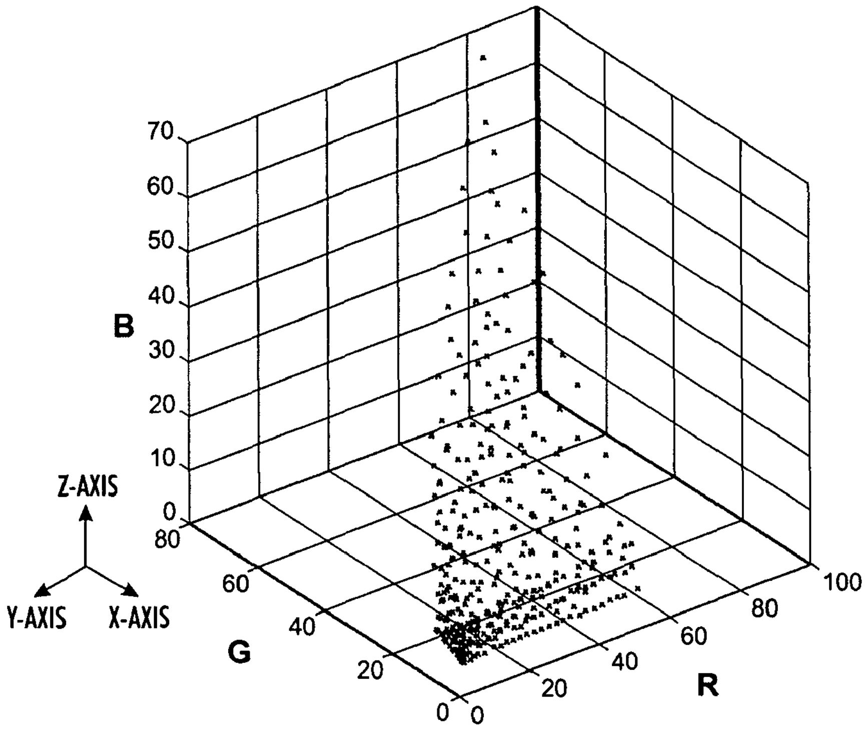
FIG. 5B is a 3-axes graphic depicting multiple RGB value obtained for the sub-sampled reflectance spectra space that represents the volume occupied by the misregistration states in the scanner RGB gamut in accordance with the present disclosure.

Referring now to FIGS. 5A and 5B, FIG. 5A shows the combined RGB channel efficiency functions obtained by solving Equation 10, discussed infra, and FIG. 5B shows the volume occupied by possible color separation misregistrations in the RGB gamut associated with broadband multi-channel scanning module 302.

The reflectance measured at a particular pixel as measured by broadband multi-channel scanning module 302 (See FIG. 3) may be expressed by a modified version of Equation 1 as:

$$R(\lambda) = \sum_{ij} \beta_{ij} \sqrt{R_i(\lambda) R_j(\lambda)}, \tag{7}$$

where $R_i$ and $R_j$ denote the reflectance of Neugebauer primary patches 328. However, the "i" referred to in Equation 7 is not the same as the i=r,b,g referred to above. Additionally or alternatively, Equation 7 may describe reflections from other patches as well. From Equations 2 and 7, the color measurements obtained by the three color channels associated with multi-channel scanning module 302 for an arbitrary reflectance spectrum R(λ) may be expressed by Equation 8 as follows:

$$y_k = \int_{\lambda_1}^{\lambda_2} s_k(\lambda) \sum_{ij} \beta_{ij} \sqrt{R_i(\lambda) R_j(\lambda)}\, d\lambda. \tag{8}$$

And assume that:

$$L_{kij} = \int_{\lambda_1}^{\lambda_2} s_k(\lambda) \sqrt{R_i(\lambda) R_j(\lambda)}\, d\lambda. \tag{9}$$

The intensity measured at each scanner color channel of multi-channel scanning module 302 may be expressed as follows:

$$y_k = \sum_{ij} \beta_{ij} L_{kij} \tag{10}$$

Where k=r,g,b in Equations 8, 9, and 10 when broadband multi-channel scanning module 302 is embodied as a RGB scanner. However, the "i" referred to in Equations 8-10 above and Equations 11-12 is not the same as the i=r,b,g referred to above. However, in accordance with the present disclosure, another model is disclosure for channel measurements of broadband multi-channel scanning module 302 inspired by the standard Yule-Nielsen correction applied to the Neugebauer reflectance model. To account for substrate scattering, the Neugebauer model may be extended by adding an empirical correction parameter γ as:

$$R(\lambda) = \left\{ \sum_i \alpha_i [R_i(\lambda)]^{1/\gamma} \right\}^{\gamma}, \tag{11}$$

where the coefficients $\alpha_i$ and γ serve as fit parameters in standard printer modeling, such as modeling of printing module 324.

However, for the purposes of simplifying subsequent modeling, another model is provided that models scanner color measurements (e.g., broadband multi-channel scanning module 302) that accounts for scattering, inspired by the standard Yule-Nielsen correction applied to the Neugebauer reflectance model, and includes a $\gamma_k$ such as in:

$$y_k = \left(\sum_i \beta_{ii}(L_{kii})^{1/\gamma_k}\right)^{\gamma_k}. \tag{12}$$

Note that only diagonal elements of β are considered, (i.e., $\beta_{ii}$) and those elements are computed in the absence of scattering. In other words, $\beta_{ii}$ simply become the fill factors of the individual regions shown in FIG. 1B. In this way, the scattering effects are accounted for purely by $\gamma_k$. Measurements of the misregistration gamut target 322 may then be used to obtain the values of $\gamma_k$, such that:

$$\hat{\gamma}_k = \underset{\gamma_k}{\operatorname{argmin}} \| y_k - (\beta(L_{k_{ii}})^{1/\gamma_k})^{\gamma_k} \|_2^2. \tag{13}$$

Note that Equation 13 may be utilized by module 342 during step 316 (see FIG. 3) to estimate $\gamma_k$.

However, the model described by Equation 12 may describe scanner RGB measurements (e.g., broadband multi-channel scanning module 302) in terms of misregistrations states based upon a misregistration-patch, e.g., plurality-patch 100. Note that the matrix β formed from the coefficients $\beta_{ii}$ is a function of ΔC, ΔM and ΔY, which represent relative (hence the delta function) misregistration of C, M, and Y color separations with respect to a K color separation, e.g., the color separations associated with printing module 324. To get color separation misregistration estimates from RGB measurements, such as from broadband multi-channel scanning module 302, we need to invert the model, e.g., derive a model capable of estimating color separation misregistrations as a function of channel measurements from broadband multi-channel scanning module 302.

β may be approximated by discarding all but the first order coefficients of its Taylor series expansion; denote $y'_k = (y_k)^{1/\gamma_k}$ to get $$y'_k = \left(\sum_i \beta_{ii}^0 + \left(\sum_i \frac{\partial \beta_{ii}}{\partial \Delta C}\bigg|_{\Delta C=0}\right)\Delta C + \left(\sum_i \frac{\partial \beta_{ii}}{\partial \Delta M}\bigg|_{\Delta M=0}\right)\Delta M + \left(\sum_i \frac{\partial \beta_{ii}}{\partial \Delta Y}\bigg|_{\Delta Y=0}\right)\Delta Y\right)(L_{k_{ii}})^{1/\gamma_k}. \tag{14}$$

Referring to Equation 14, note that $y'_k$ are linear in ΔC, ΔM and ΔY and also note that gamma-compensated scanner color measurements can be expressed by the linear relation as follows:

$$\begin{bmatrix} r' \\ g' \\ b' \end{bmatrix} = A' \begin{bmatrix} \Delta C \\ \Delta M \\ \Delta Y \end{bmatrix} + c', \tag{15}$$

where $$A = \begin{bmatrix} \left(\sum_i \frac{\partial \beta_{ii}}{\partial \Delta C}\Big|_{\Delta C=0}\right)(L_{r_{ii}})^{1/\gamma_r} & \left(\sum_i \frac{\partial \beta_{ii}}{\partial \Delta M}\Big|_{\Delta M=0}\right)(L_{r_{ii}})^{1/\gamma_r} & \left(\sum_i \frac{\partial \beta_{ii}}{\partial \Delta C}\Big|_{\Delta C=0}\right)(L_{r_{ii}})^{1/\gamma_r} \\ \left(\sum_i \frac{\partial \beta_{ii}}{\partial \Delta C}\Big|_{\Delta C=0}\right)(L_{g_{ii}})^{1/\gamma_g} & \left(\sum_i \frac{\partial \beta_{ii}}{\partial \Delta M}\Big|_{\Delta M=0}\right)(L_{g_{ii}})^{1/\gamma_g} & \left(\sum_i \frac{\partial \beta_{ii}}{\partial \Delta Y}\Big|_{\Delta Y=0}\right)(L_{g_{ii}})^{1/\gamma_g} \\ \left(\sum_i \frac{\partial \beta_{ii}}{\partial \Delta C}\Big|_{\Delta C=0}\right)(L_{b_{ii}})^{1/\gamma_b} & \left(\sum_i \frac{\partial \beta_{ii}}{\partial \Delta M}\Big|_{\Delta M=0}\right)(L_{b_{ii}})^{1/\gamma_b} & \left(\sum_i \frac{\partial \beta_{ii}}{\partial \Delta Y}\Big|_{\Delta Y=0}\right)(L_{b_{ii}})^{1/\gamma_b} \end{bmatrix}, \tag{16}$$

and $$c' = \begin{bmatrix} \sum_i \beta_{ii}^0 (L_{r_{ii}})^{1/\gamma_r} \\ \sum_i \beta_{ii}^0 (L_{g_{ii}})^{1/\gamma_g} \\ \sum_i \beta_{ii}^0 (L_{b_{ii}})^{1/\gamma_b} \end{bmatrix}. \tag{17}$$

Figure 6:
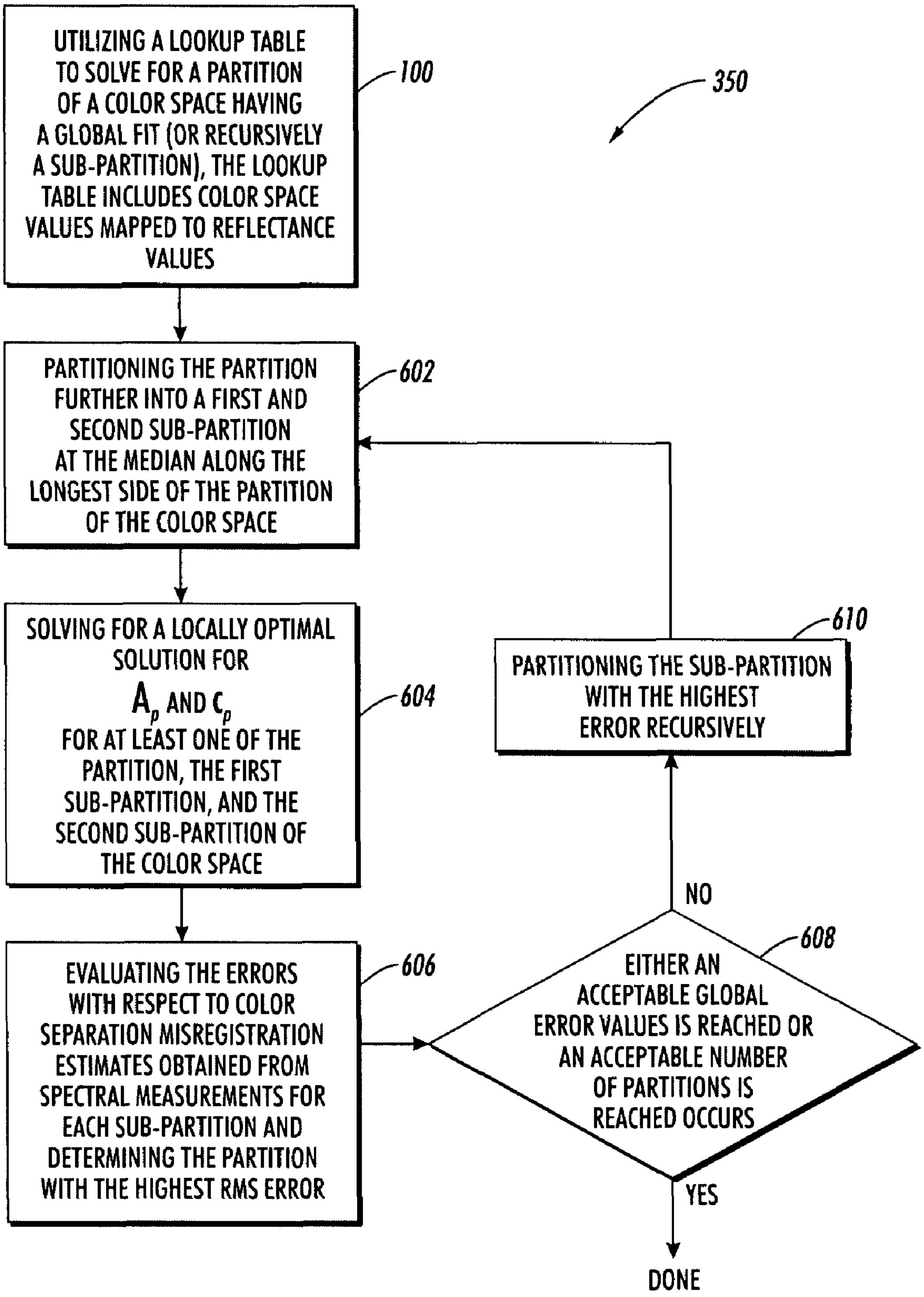
FIG. 6 is a flow chart diagram depicting an embodiment of step 350 of FIG. 3 in accordance with the present disclosure.
Figure 7A:
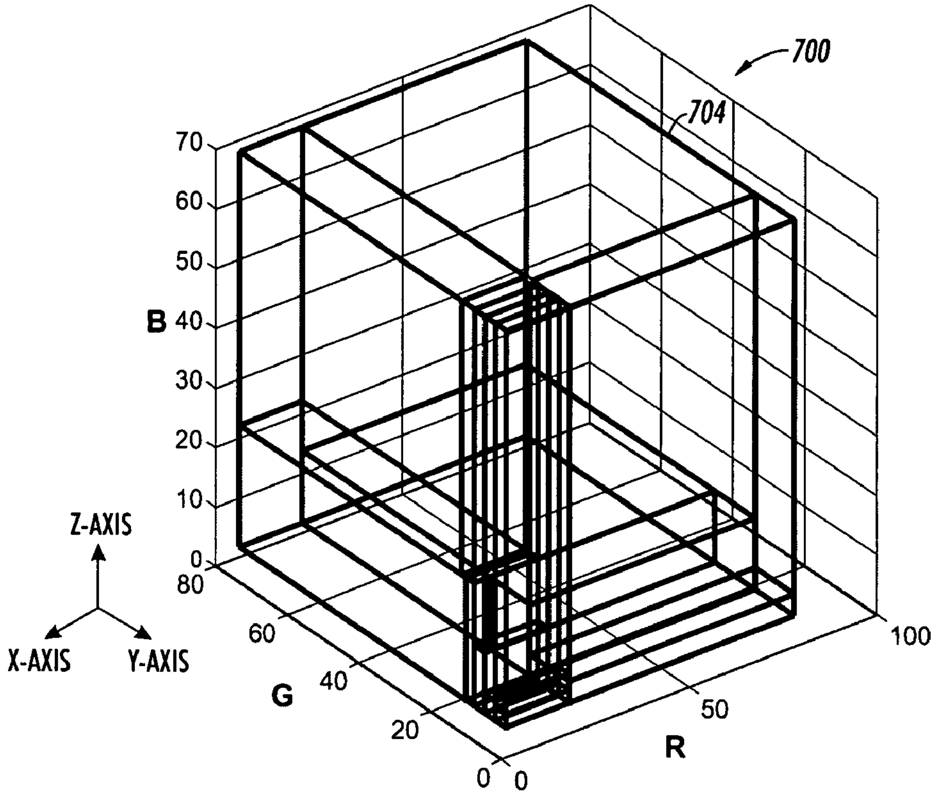
FIG. 7A is a 3-axes graphic depicting a RGB color space with multiple partitions in accordance with the present disclosure.
Figure 7B:
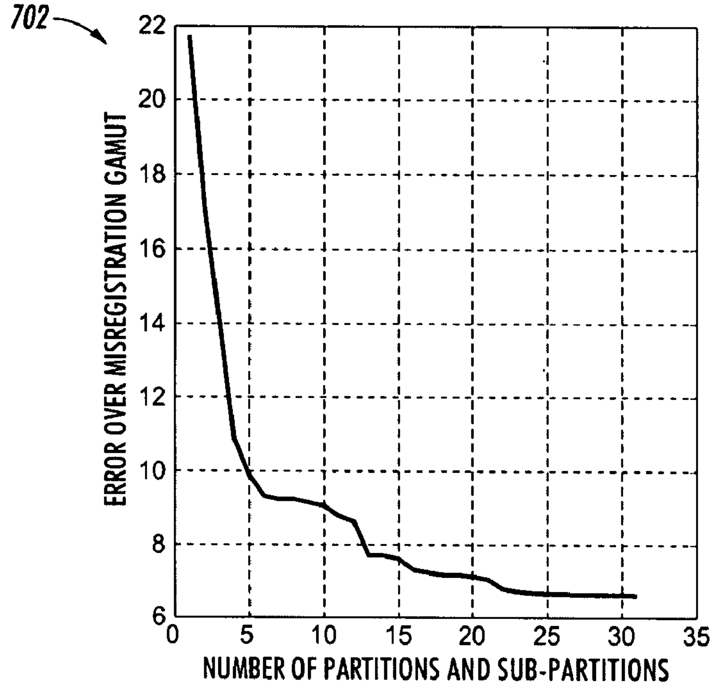
FIG. 7B is a 2-axes graphic depicting error over the entire misregistration gamut for all three separations as a function of the number of partitions, such as the multiple partitions represented in FIG. 7A in accordance with the present disclosure.

Note the linearity of gamma-compensated color measurements with respect to misregistration states as expressed by Equation 15 and also note that β is only piecewise continuous; together these two aspects suggest that the inverse of Equation 15 has a locally linear solution. Therefore, a model that expresses estimated color separation misregistration states in terms of gamma-compensated color measurements is as follows:

$$\begin{bmatrix} \Delta C \\ \Delta M \\ \Delta Y \end{bmatrix} = A_p \begin{bmatrix} r' \\ g' \\ b' \end{bmatrix} + c_p, \tag{18}$$

where an RGB color space may be divided into P partitions, and $A_p$ and $c_p$ represent the coefficients for the $p^{th}$ partition. A closed-form solution to Equation 18 is highly intractable due to the inseparable partial derivatives that constitute the coefficients of β, however, an inverting algorithm that may be utilized by step 350 of FIG. 3 bas ed upon a hierarchical, locally linear framework. An embodiment of step 350 of FIG. 3 is depicted in FIG. 6. Refer simultaneously to FIGS. 6, 7A, and 7B. FIG. 6 is a flow chart diagram depicting an embodiment of step 350 of FIG. 3. Step 350 of FIG. 6 includes step

600 that is utilizing a look up table to solve for a partition of a color space having a global fit. The lookup table of step 600 may include color space values mapped to reflectance values. The lookup table may include color space values mapped to respective reflectance values. The look up table may be the one discussed supra regarding FIGS. 2A and 2B. Additionally or alternatively, the look up table may be one discussed supra regarding FIGS. 4A and 4B. The partition referred to in step 600 may be cuboid 704 of FIG. 7A. Step 602 is partitioning the partition, e.g. cuboid 704, further into a first and second sub-partition at the median along the longest side of the partition of the color space. Step 604 is solving for a locally optimal solution for $A_p$ and $c_p$ for at least one of the partition, the first sub-partition, and the second sub-partition of the color space. Step 606 is Evaluating the errors with respect to color separation misregistration estimates obtained from spectral measurements for each sub-partition and determining the partition with the highest error. Then decision 608 may be made. Decision 608 is deciding to repeat on to step 610 or if step 350 terminates. If either an acceptable global error value is reached or an acceptable number of partitions is reached then step 350 may be finished. Otherwise, step 350 may continue on the step 610, which is partitioning the sub-partition with the highest error recursively, and that partition is further partitioned during step 602, etc.

Referring to FIG. 7A, graphic 100 is a 3-axes graphic depicting a RGB color space with multiple partitions as described in step 350. FIG. 7B shows a graphic 702, which shows the results (error over a misregistration gamut) of an implementation of step 350 as a function of the total number of partitions and sub-partitions.

Figure 8:
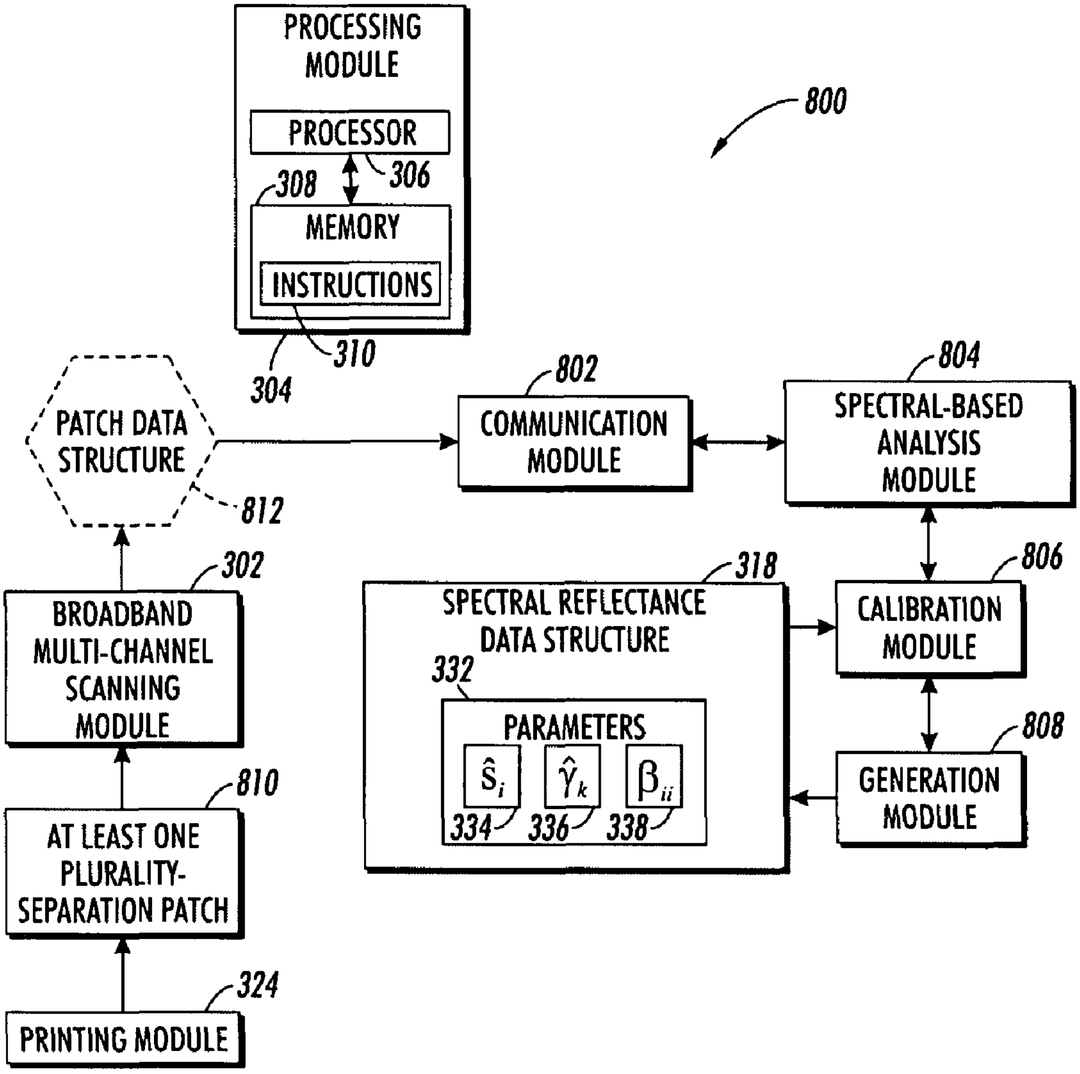
FIG. 8 is a depiction of a system 800 for characterizing color separation misregistration of a multi-color printing system utilizing a broadband multi-channel scanning module in accordance with the present disclosure.

Referring to the drawings, FIG. 8 depicts a system 800 for characterizing color separation misregistration of a multi-color printing system. System 800 may include communication module 802, spectral-based analysis module 804, calibration module 806, and generation module 808. Modules 802 through 808 may be implemented in hardware, software, software in execution, and/or some combination thereof. Additionally or alternatively, system 800 may be implemented utilizing an operative set of processor executable instructions, e.g., instructions 310, configured for execution by at least one processor, e.g., processor 306, for determining color separation misregistration in a multi-color printing system. For example, system 800 may determine color separation misregistration in a printing system corresponding to printing module 324. Processing module 304 may be similar to the one shown in FIG. 3, however, as depicted in FIG. 8, for facilitating system 800. Additionally or alternatively, in another embodiment, processing module 304 may be configured using a Harvard Architecture.

Printing module 324 may print at least one plurality-separation patch 1100 that may be similar to plurality-separation patch 100 of FIG. 1. Broadband multi-channel scanning module 302 may either directly or indirectly scan at least one plurality-separation patch 800. Additionally or alternatively, broadband multi-channel scanning module 302 may directly or indirectly convert it to (or generate) patch data structure 812. For example, broadband multi-channel scanning module may be a software interface to an RGB scanner that can scan at least one plurality-separation patch 810 and then process the scan so that patch data structure 812 is created; patch data structure 812 may include any sufficient data. Additionally or alternatively, broadband multi-channel scanning module may be an RGB scanner.

Patch data structure 812 may be implemented in hardware, software, firmware, and/or some combination thereof. For example, patch data structure 812 may be an object such as in an object orientated programming language and/or patch data structure 812 may be on in the stack memory or in the heap memory of a computer system.

Communication module 802 can receive patch data structure 812. As mentioned supra, communication module 802 may be implemented in hardware and/or software. For example, communication module 802 may be an internet connection, a TCP/IP connection, a bus, a USB connection, or any technology sufficient for receiving patch data structure 812. Note that patch data structure 812 may have been generated by utilizing broadband multi-channel scanning module 302; therefore, patch data structure 812 may correspond to at least one plurality-separation patch 810.

System 800 may include spectral-based analysis module 804, and may be in operative communication with communication module 802 (which may be similar to the one shown in FIG. 3). Spectral-based analysis module 804 can process patch data structure 812 to characterize color separation misregistration and may be calibrated to characterize color separation registrations errors of printing module 324 utilizing broadband multi-channel scanning module 302. Steps 352 of FIG. 3 may be utilized by spectral-based analysis module 804 directly and/or indirectly. Additionally or alternatively, spectral-based analysis module 1104 may direct step 352; for example, spectral-based analysis module 804 may call one or more software subroutines, e.g. a Java method, so that step 352 occurs.

System 1100 may also include calibration module 806 which may assist (or conduct) the calibration of spectral-based analysis module 806. Additionally or alternatively, calibration module 806 may utilize spectral reflectance data structure 318, which may be similar the one depicted in FIG. 2. Step 346 (see FIG. 3) is calibrating a spectral-based analysis module (e.g., spectral-based analysis module 348) utilizing the spectral reflectance data structure, e.g., spectral reflectance data structure 318; step 346 may be implemented and/or utilized by calibration module 806, directly or indirectly. Note the arrow between calibration module 806 and spectral-based analysis module 804 that indicates the two modules may be in operative communication with each other. Calibration module also may include step 350 as depicted in either FIG. 3 and/or FIG. 6. Step 350 is inverting Equation 15 utilizing the parameters of the spectral reflectance data structure resulting in a solution for at least one Equation 18 for at least one P partition of a RGB color space.

Generation module 808 may generate spectral reflectance data structure 318. Additionally or alternatively, generation module 808 may implement and/or utilize either directly of indirectly step 316. Additionally, generation module 808 may utilize any of the block items as shown in FIG. 3, e.g., printing module as necessary to implement step 316. Any of modules 802 through 808 may utilize any other modules shown in FIG. 3 to sufficiently and/or efficiently implement system 810.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for characterizing color separation misregistration of a multi-color printing system, the method comprising:

generating a spectral reflectance data structure corresponding to a broadband multichannel scanning module, wherein the spectral reflectance data structure includes at least one parameter, wherein the at least one parameter is an approximation of at least one of a substrate scattering coupling matrix associated with scattering of light reflected from the substrate and Yule-Nielsen parameters and includes an approximation of a combined quantum efficiency of the scanning module calculated by a combined quantum efficiency module, wherein the combined quantum efficiency module utilizes a first equation of $\hat{s}_i = \arg\min_{s_i} \|y_i - Rs_i\|_2^2 + \alpha_i \|Ls_i\|_2^2$, wherein $y_i \in \Re^{N\times 1}$, $L \in \Re^{31\times 31}$ is the Laplacian operator that provides a penalty on the roughness of $s_i$, and $\alpha_i$ are regularization parameters;

calibrating a spectral-based analysis module by utilizing the spectral reflectance data structure; and characterizing color separation misregistration utilizing the calibrated spectral-based analysis module by examining at least one color misregistration patch.

2. The method according to claim 1, wherein the method is implemented by an operative set of processor executable instructions configured for execution by at least one processor.

3. The method according to claim 1, wherein the broadband multichannel scanning module is a RGB scanner.

4. The method according to claim 1, wherein the step of generating the spectral reflectance data structure comprises: marking a substrate forming a misregistration gamut target on the substrate, wherein the misregistration gamut target includes at least one training patch.

5. The method according to claim 4, wherein the gamut target further includes at least one Neugebauer primary patch.

6. The method according to claim 4, wherein the step of marking the substrate forming a misregistration gamut target on the substrate utilizes a printing module.

7. The method according to claim 1, wherein the step of generating the spectral reflectance data structure comprises:

scanning a misregistration gamut target utilizing the broadband multi-channel scanning module, wherein the misregistration gamut target includes at least one training patch and at least one Neugebauer primary patch.

8. The method according to claim 1, wherein the approximation of the Yule-Nielsen parameters is calculated by a Yule-Nielsen parameters module, wherein the Yule-Nielsen parameters module utilizes a second equation of $\hat{y}_k = \arg\min_{yk} \|yk - (\beta(L_{k_u})^{1/yk})^{yk}\|_2^2$, wherein $y_k$ accounts for the scattering effects of the diagonal elements of $\beta$.

9. The method according to claim 1, wherein the step of calibrating the spectral-based analysis module by utilizing the spectral reflectance data structure comprises:

inverting a third equation of $$\begin{bmatrix} r' \\ g' \\ b' \end{bmatrix} = A' \begin{bmatrix} \Delta C \\ \Delta M \\ \Delta Y \end{bmatrix} + c'$$

utilizing the at least one parameter of the spectral reflectance data structure, wherein the step of inverting the third equation results in a solution in accordance with at least one fourth equation of $$\begin{bmatrix} \Delta C \\ \Delta M \\ \Delta Y \end{bmatrix} = A_p \begin{bmatrix} r' \\ g' \\ b' \end{bmatrix} + c_p$$

for at least one P partition of a RGB color space.

10. The method according to claim 9, wherein the step of characterizing color separation misregistration utilizing the calibrated spectral-based analysis module by examining the at least one color separation misregistration patch comprises:

scanning the at least one color separation misregistration patch utilizing the broadband multi-channel scanning module;

determining r', g', and b' for the at least one color separation misregistration patch; and determining the approximate color separation misregistration within the spatial domain of the at least one color separation misregistration patch in accordance with the at least one fourth equation for the at least one P partition of the RGB color space by utilizing the r', g', and b'.

11. The method according to claim 1, wherein the approximation of the combined quantum efficiency of the scanning module is calculated by a combined quantum efficiency module, wherein the combined quantum efficiency module finds a solution to an overdetermined system of equations relating reflectances from the plurality-separation misregistration patch to RGB values generated by the scanning module when it scans a substrate marked with the plurality-separation misregistration patch.

12. The method according to claim 1, wherein the approximation of the Yule-Nielsen parameters are calculated by a Yule-Nielsen parameters module, wherein the Yule-Nielsen parameters module finds a solution to an overdetermined system of equations relating scanner RGB values generated by the scanning module when it scans a substrate marked with a plurality of halftoned patches to respective fill factors of the plurality of halftoned patches.

13. The method according to claim 1, wherein the step of calibrating the spectral-based analysis module by utilizing the spectral reflectance data structure comprises:

inverting a third equation relating scanner RGB values generated by the scanning module when it scans a substrate marked with the plurality-separation misregistration patch to misregistration measurements using the at least one parameter of the spectral reflectance data structure, wherein the step of inverting the third equation results in a fourth equation that determines the misregistration measurements from scanner RGB values for at least one P partition of a RGB color space.

14. The method according to claim 1, wherein only diagonal elements are used for the substrate scattering coupling matrix.

15. A processing module capable of communicating with a memory having an operative set of processor executable instructions configured for execution by at least one processor of the processing module for determining color separation misregistration in a multi-color printing system, the processing module comprising:

a communication module configured for receiving a patch data structure, wherein the patch data structure corresponds to at least one color separation misregistration patch, wherein the patch data structure was generated utilizing a broadband multi-channel scanning module; and a spectral-based analysis module in operative communication with the communication module, wherein the spectral-based analysis module is configured to process the patch data structure to characterize color separation misregistration associated with at least one plurality separation misregistration patch;

a generation module configured for generating a spectral reflectance data structure corresponding to the multi-channel scanning, wherein the spectral reflectance data structure includes at least one parameter including an approximation of a combined quantum efficiency of the scanning module;

a calibration module for calibrating the spectral-based analysis module by utilizing the spectral reflectance data structure wherein the calibration module calibrates the spectral-based analysis module by utilizing the spectral reflectance data structure by:

inverting a third equation of $$\begin{bmatrix} r' \\ g' \\ b' \end{bmatrix} = A' \begin{bmatrix} \Delta C \\ \Delta M \\ \Delta Y \end{bmatrix} + c'$$

utilizing the at least one parameter of the spectral reflectance data structure resulting in a solution in accordance with at least one fourth equation of $$\begin{bmatrix} \Delta C \\ \Delta M \\ \Delta Y \end{bmatrix} = A_p \begin{bmatrix} r' \\ g' \\ b' \end{bmatrix} + c_p$$

for at least one P partition of a RGB color space.

16. The processing module according to claim 15, wherein the broadband multi-channel scanning module is an RGB color scanner.

17. The processing module according to claim 15, wherein the at least one parameter is further an approximation of at least one of a substrate scattering coupling matrix associated with scattering of light reflected from the substrate and Yule-Nielsen parameters.

18. The processing module according to claim 15, wherein:

the multi-color printing system uses a color space having at least three color separations; and the patch data structure processed by the spectral-based analysis module corresponds to a single plurality-separation misregistration patch of the at least one plurality-separation misregistration patch, and the spectral-based analysis module characterizes the color separation misregistration associated with all of the at least three color separations.

19. A non-transitory storage medium storing therein an operative set of processor executable instructions configured to perform a method by at least one processor for estimating color separation misregistration, the method comprising:

calibrating a spectral-based analysis module using a spectral reflectance data structure including at least one parameter including an approximation of a combined quantum efficiency of a broadband multi-channel scanning module and wherein the calibration performs the step of:

inverting a third equation of $$\begin{bmatrix} r' \\ g' \\ b' \end{bmatrix} = A' \begin{bmatrix} \Delta C \\ \Delta M \\ \Delta Y \end{bmatrix} + c'$$

utilizing the at least one parameter of the spectral reflectance data structure, wherein the step of inverting the third equation results in a solution in accordance with at least one fourth equation of $$\begin{bmatrix} \Delta C \\ \Delta M \\ \Delta Y \end{bmatrix} = A_p \begin{bmatrix} r' \\ g' \\ b' \end{bmatrix} + c_p$$

for at least one P partition of a RGB color space; and characterizing a color separation misregistration by examining a color separation misregistration patch utilizing the broadband multi-channel scanning module, the color separation misregistration patch having a plurality of overlapping parallel lines forming a line pattern.

20. The storage medium according to claim 19, wherein the at least one parameter further includes an approximation of the Yule-Nielsen parameters, the approximation of the Yule-Nielsen parameters is calculated by a Yule-Nielsen parameters module, wherein the Yule-Nielsen parameters module finds a solution to an overdetermined system of equations relating scanner RGB values generated by the scanning module when it scans a substrate marked with a plurality of halftoned patches to respective fill factors of the plurality of halftoned patches.

21. A method for characterizing color separation misregistration of a multi-color printing system, comprising:

generating a spectral reflectance data structure corresponding to a broadband multi-channel scanning module, wherein the spectral reflectance data structure includes at least one parameter which is an approximation of at least one of , and $\hat{s}_i$; $\beta_{ii}$, and $\hat{\gamma}_k$;

calibrating a spectral-based analysis module by utilizing the spectral reflectance data structure; and characterizing color separation misregistration utilizing the calibrated spectral-based analysis module by examining at least one color separation misregistration patch, the at least one color separation misregistration patch having a first set of parallel lines overlapping a second set of parallel lines forming a first line pattern, the at least one color separation misregistration patch further having a third set of parallel lines overlapping a fourth set of parallel lines forming a second line pattern;

wherein the approximation of $\hat{\gamma}_k$ is calculated by a $\hat{\gamma}_k$ module, wherein the $\hat{\gamma}_k$ module utilizes a second equation of $\hat{y}_k = \arg\min_{yk} \|y_k - (\beta(L_{k_u})^{1/yk})^{Yk}\|_2^2$, wherein $\gamma_k$ accounts for the scattering effects of the diagonal elements of β.

22. The method according to claim 21, wherein the approximation of $\hat{s}_i$ is calculated by a $\hat{s}_i$ module, wherein the $\hat{s}_i$ module utilizes a first equation of $\hat{s}_i = \arg\min_{s_i} \|y_i - Rs_i\|_2^2 + \alpha_i \|Ls_i\|_2^2$, wherein $y_i \in \Re^{N \times 1}$, $L \in \Re^{31 \times 31}$ is the Laplacian operator that provides a penalty on the roughness of $s_i$, and $\alpha_i$ are regularization parameters.

23. The method according to claim 21, wherein the step of calibrating the spectral-based analysis module by utilizing the spectral reflectance data structure comprises:

inverting a third equation of $$\begin{bmatrix} r' \\ g' \\ b' \end{bmatrix} = A' \begin{bmatrix} \Delta C \\ \Delta M \\ \Delta Y \end{bmatrix} + c'$$

utilizing the at least one parameter of the spectral reflectance data structure, wherein the step of inverting the third equation results in a solution in accordance with at least one fourth equation of $$\begin{bmatrix} \Delta C \\ \Delta M \\ \Delta Y \end{bmatrix} = A_p \begin{bmatrix} r' \\ g' \\ b' \end{bmatrix} + c_p$$

for at least one P partition of a RGB color space.

* * * * *